US010957174B2

(12) United States Patent
Tavares

(10) Patent No.: US 10,957,174 B2
(45) Date of Patent: Mar. 23, 2021

(54) COMMUNICATION-LINKED FLOODLIGHT CONTROLLERS WITH AUDIO/VIDEO RECORDING AND COMMUNICATION FEATURES

(71) Applicant: Amazon Technologies, Inc., Seattle, WA (US)

(72) Inventor: Kevin Tavares, Glendale, AZ (US)

(73) Assignee: Amazon Technologies, Inc., Seattle, WA (US)

( * ) Notice: Subject to any disclaimer, the term of this patent is extended or adjusted under 35 U.S.C. 154(b) by 125 days.

(21) Appl. No.: 15/942,334

(22) Filed: Mar. 30, 2018

(65) Prior Publication Data

US 2018/0293863 A1 Oct. 11, 2018

Related U.S. Application Data

(60) Provisional application No. 62/482,112, filed on Apr. 5, 2017.

(51) Int. Cl.
*G08B 15/00* (2006.01)
*H04M 11/02* (2006.01)
(Continued)

(52) U.S. Cl.
CPC .......... *G08B 15/00* (2013.01); *H04M 11/025* (2013.01); *H05B 47/105* (2020.01); *H05B 47/19* (2020.01);
(Continued)

(58) Field of Classification Search
CPC ... G08B 15/00; G08B 13/19619; H05B 47/19
See application file for complete search history.

(56) References Cited

U.S. PATENT DOCUMENTS

| 4,764,953 A | 8/1988 | Chern et al. |
| 5,428,388 A | 6/1995 | von Bauer et al. |

(Continued)

FOREIGN PATENT DOCUMENTS

| CN | 2585521 Y | 11/2003 |
| CN | 2792061 Y | 6/2006 |

(Continued)

OTHER PUBLICATIONS

Kim, YeonKyung, International Search Report and Written Opinion of the International Searching Authority for PCT/US/2018/025577, dated Jul. 20, 2018, International Application Division, Korean Intellectual Property Office, Republic of Korea.

*Primary Examiner* — Rowina J Cattungal
(74) *Attorney, Agent, or Firm* — Greenberg Traurig, LLP

(57) ABSTRACT

Some aspects of the present embodiments provide a plurality of exterior lighting devices that are communicatively linked and capable of simultaneous (or near simultaneous) activation. At least a subset of the lighting devices may have cameras that enable live viewing (and/or later viewing of recorded footage) of the area around each lighting device (e.g., by the property owner, by law enforcement, or by any other authorized person or entity), and speakers that are capable of providing live verbal warnings (and/or automatic audible warnings) to intruders. Some of the present embodiments may enable the user to remotely control the light and/or sound emitted from the lighting devices.

23 Claims, 18 Drawing Sheets

(51) Int. Cl.
*H05B 47/19* (2020.01)
*H05B 47/105* (2020.01)
*G08B 13/196* (2006.01)

(52) U.S. Cl.
CPC .. *G08B 13/19665* (2013.01); *G08B 13/19684* (2013.01); *G08B 13/19695* (2013.01)

(56) References Cited

U.S. PATENT DOCUMENTS

| | | | |
|---|---|---|---|
| 5,760,848 A | 6/1998 | Cho | |
| 6,072,402 A | 6/2000 | Kniffin et al. | |
| 6,192,257 B1 | 2/2001 | Ray | |
| 6,271,752 B1 | 8/2001 | Vaios | |
| 6,429,893 B1 | 8/2002 | Xin | |
| 6,456,322 B1 | 9/2002 | Marinacci | |
| 6,476,858 B1 | 11/2002 | Ramirez Diaz et al. | |
| 6,633,231 B1 | 10/2003 | Okamoto et al. | |
| 6,658,091 B1 | 12/2003 | Naidoo et al. | |
| 6,753,774 B2 | 6/2004 | Pan et al. | |
| 6,970,183 B1 | 11/2005 | Monroe | |
| 7,062,291 B2 | 6/2006 | Ryley et al. | |
| 7,065,196 B2 | 6/2006 | Lee | |
| 7,085,361 B2 | 8/2006 | Thomas | |
| 7,109,860 B2 | 9/2006 | Wang | |
| 7,193,644 B2 | 3/2007 | Carter | |
| 7,304,572 B2 | 12/2007 | Sheynman et al. | |
| 7,382,249 B2 | 6/2008 | Fancella | |
| 7,450,638 B2 | 11/2008 | Iwamura | |
| 7,643,056 B2 | 1/2010 | Silsby | |
| 7,683,924 B2 | 3/2010 | Oh et al. | |
| 7,683,929 B2 | 3/2010 | Elazar et al. | |
| 7,738,917 B2 | 6/2010 | Ryley et al. | |
| 8,139,098 B2 | 3/2012 | Carter | |
| 8,144,183 B2 | 3/2012 | Carter | |
| 8,154,581 B2 | 4/2012 | Carter | |
| 8,619,136 B2 | 12/2013 | Howarter et al. | |
| 8,872,915 B1 | 5/2014 | Scalisi et al. | |
| 8,780,201 B1 | 7/2014 | Scalisi et al. | |
| 8,823,795 B1 | 9/2014 | Scalisi et al. | |
| 8,836,749 B2 | 9/2014 | Katz | |
| 8,842,180 B1 | 9/2014 | Kasmir et al. | |
| 8,937,659 B1 | 1/2015 | Scalisi et al. | |
| 8,941,736 B1 | 1/2015 | Scalisi | |
| 8,947,530 B1 | 2/2015 | Scalisi | |
| 8,953,040 B1 | 2/2015 | Scalisi et al. | |
| 9,013,575 B2 | 4/2015 | Scalisi | |
| 9,049,352 B2 | 6/2015 | Scalisi et al. | |
| 9,053,622 B2 | 6/2015 | Scalisi | |
| 9,058,738 B1 | 6/2015 | Scalisi | |
| 9,060,103 B2 | 6/2015 | Scalisi | |
| 9,060,104 B2 | 6/2015 | Scalisi | |
| 9,065,987 B2 | 6/2015 | Scalisi | |
| 9,094,584 B2 | 7/2015 | Scalisi et al. | |
| 9,113,051 B1 | 8/2015 | Scalisi | |
| 9,113,052 B1 | 8/2015 | Scalisi et al. | |
| 9,118,819 B1 | 8/2015 | Scalisi et al. | |
| 9,142,214 B2 | 9/2015 | Scalisi | |
| 9,160,987 B1 | 10/2015 | Kasmir et al. | |
| 9,165,444 B2 | 10/2015 | Scalisi | |
| 9,172,920 B1 | 10/2015 | Kasmir et al. | |
| 9,172,921 B1 | 10/2015 | Scalisi et al. | |
| 9,172,922 B1 | 10/2015 | Kasmir et al. | |
| 9,179,107 B1 | 11/2015 | Scalisi | |
| 9,179,108 B1 | 11/2015 | Scalisi | |
| 9,179,109 B1 | 11/2015 | Kasmir et al. | |
| 9,196,133 B2 | 11/2015 | Scalisi et al. | |
| 9,197,867 B1 | 11/2015 | Scalisi et al. | |
| 9,230,424 B1 | 1/2016 | Scalisi et al. | |
| 9,237,318 B2 | 1/2016 | Kasmir et al. | |
| 9,247,219 B2 | 1/2016 | Kasmir et al. | |
| 9,253,455 B1 | 2/2016 | Harrison et al. | |
| 9,342,936 B2 | 5/2016 | Scalisi | |
| 9,508,239 B1 | 11/2016 | Harrison et al. | |
| 9,547,963 B1 | 1/2017 | Trundle et al. | |
| 9,654,678 B1* | 5/2017 | Fu | G06F 3/16 |
| 9,736,284 B2 | 8/2017 | Scalisi et al. | |
| 9,743,049 B2 | 8/2017 | Scalisi et al. | |
| 9,769,435 B2 | 9/2017 | Scalisi et al. | |
| 9,786,133 B2 | 10/2017 | Harrison et al. | |
| 9,799,183 B2 | 10/2017 | Harrison et al. | |
| 2002/0094111 A1 | 7/2002 | Puchek et al. | |
| 2002/0147982 A1 | 10/2002 | Naidoo et al. | |
| 2003/0043047 A1 | 3/2003 | Braun | |
| 2004/0085205 A1 | 5/2004 | Yeh | |
| 2004/0085450 A1 | 5/2004 | Stuart | |
| 2004/0086093 A1 | 5/2004 | Schranz | |
| 2004/0095254 A1 | 5/2004 | Maruszczak | |
| 2004/0135686 A1 | 7/2004 | Parker | |
| 2005/0111660 A1 | 5/2005 | Hosoda | |
| 2006/0010199 A1 | 1/2006 | Brailean et al. | |
| 2006/0022816 A1 | 2/2006 | Yukawa | |
| 2006/0139449 A1 | 6/2006 | Cheng et al. | |
| 2006/0156361 A1 | 7/2006 | Wang et al. | |
| 2007/0008081 A1 | 1/2007 | Tylicki et al. | |
| 2007/0267983 A1* | 11/2007 | Van De Ven | F21K 9/64 315/294 |
| 2009/0072988 A1* | 3/2009 | Haywood | G08B 25/008 340/686.6 |
| 2010/0225455 A1 | 9/2010 | Claiborne et al. | |
| 2013/0057695 A1 | 3/2013 | Huisking | |
| 2014/0267716 A1 | 9/2014 | Child et al. | |
| 2015/0035437 A1* | 2/2015 | Panopoulos | F21V 14/02 315/112 |
| 2015/0163463 A1 | 6/2015 | Hwang et al. | |
| 2016/0027262 A1* | 1/2016 | Skotty | H05B 47/19 340/541 |
| 2016/0134826 A1* | 5/2016 | Scalisi | G06F 3/017 348/143 |
| 2017/0034485 A1* | 2/2017 | Scalisi | G07C 9/00309 |
| 2017/0109984 A1* | 4/2017 | Child | H04N 7/183 |
| 2017/0116838 A1* | 4/2017 | Weksler | G08B 15/00 |

FOREIGN PATENT DOCUMENTS

| | | |
|---|---|---|
| EP | 0944883 A1 | 6/1998 |
| EP | 1480462 A1 | 11/2004 |
| GB | 2286283 A | 8/1995 |
| GB | 2354394 A | 3/2001 |
| GB | 2357387 A | 6/2001 |
| GB | 2400958 A | 10/2004 |
| JP | 2001-103463 A | 4/2001 |
| JP | 2002-033839 A | 1/2002 |
| JP | 2002-125059 A | 4/2002 |
| JP | 2002-342863 A | 11/2002 |
| JP | 2002-344640 A | 11/2002 |
| JP | 2002-354137 A | 12/2002 |
| JP | 2002-368890 A | 12/2002 |
| JP | 2003-283696 A | 10/2003 |
| JP | 2004-128835 A | 4/2004 |
| JP | 2005-341040 A | 12/2005 |
| JP | 2006-147650 A | 6/2006 |
| JP | 2006-262342 A | 9/2006 |
| JP | 2009-008925 A | 1/2009 |
| WO | 1998/39894 A1 | 9/1998 |
| WO | 2001/13638 A1 | 2/2001 |
| WO | 2001/93220 A1 | 12/2001 |
| WO | 02-061706 A | 8/2002 |
| WO | 2002/085019 A1 | 10/2002 |
| WO | 2003/028375 A1 | 4/2003 |
| WO | 2003/096696 A1 | 11/2003 |
| WO | 2006/038760 A1 | 4/2006 |
| WO | 2006/067782 A1 | 6/2006 |
| WO | 2007/125143 A1 | 8/2007 |
| WO | 2015-028921 A1 | 3/2015 |
| WO | WO-2015028921 A1 * | 3/2015 |

* cited by examiner

COMMUNICATION-LINKED FLOODLIGHT CONTROLLERS WITH AUDIO/VIDEO RECORDING AND COMMUNICATION FEATURES

CROSS-REFERENCE TO RELATED APPLICATION

This application claims priority to provisional application Ser. No. 62/482,112, filed on Apr. 5, 2017, the entire contents of which are hereby incorporated by reference.

TECHNICAL FIELD

The present embodiments relate to security lighting systems and audio/video (A/V) recording and communication devices.

BACKGROUND

Home security is a concern for many homeowners and renters. Some exterior lighting devices include motion sensors that activate the lights when motion is detected. Such exterior lighting devices may startle would-be burglars when the lights suddenly turn on unexpectedly. These systems can thus deter crime in and around a property.

SUMMARY

The various embodiments of the present communication-linked floodlight controllers with audio/video recording and communication features (e.g., floodlight controllers that can communicate with each other) have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

One aspect of the present embodiments includes the realization that conventional exterior lighting systems may be only marginally effective at deterring intruders. For example, when a motion sensor of an exterior lighting system detects an intruder, the lights may be activated, which may startle the intruder. Savvy burglars, and other types of criminals, however, may not be startled by a light simply turning on. Further, an illuminated floodlight does little to protect a premises from invasion or burglary if no occupant is present at the time the intruder(s) enter the property. The present embodiments address these shortcomings of conventional exterior lighting devices by adding audio/video (A/V) recording and communication capabilities to one or more floodlights installed at a property. When a plurality of such lighting devices (e.g., floodlights with A/V recording and communication capabilities) are installed at a property (e.g., at different corners of the property), some of the present embodiments may communicatively link the lighting devices to each other such that activation of one lighting device automatically activates at least one of the other lighting devices (e.g., all of the other lighting devices). As an example, when a motion sensor of a conventional exterior lighting device detects an intruder, the lights may be activated, which may startle the intruder. But the intruder is likely to be further startled, and thus more likely to flee, if he or she hears the sound of a human voice in addition to the light being activated. It would be even more intimidating (to an intruder) if more than one (e.g., all) of the exterior lights, including those with associated A/V recording and communication devices installed at a property were activated together at substantially the same time.

Simultaneous (or near simultaneous) activation of multiple lighting devices that are distributed over a wide area of a property makes it almost impossible for an intruder to quickly change his or her position (in response to activation of the first lighting device that detects the intruder) to hide in a darker spot. Furthermore, when the lighting devices are activated at the same time, the intruder could be uninterruptedly surveilled (e.g., by the other activated lighting devices) regardless of how quickly he/she changes his/her position. Thus, it would be advantageous to provide a plurality of exterior lighting devices that are communicatively linked and capable of simultaneous (or near simultaneous) activation, with at least a subset of the devices having cameras that enable live viewing (and/or later viewing of recorded footage) of the area around each lighting device (e.g., by the property owner, by a renter, by law enforcement, or by any other authorized person or entity), and speakers that are capable of providing live verbal warnings (and/or automatic audible warnings) to intruders. It would be further advantageous if the audio and/or video captured by the lighting/surveillance devices could be uploaded to the cloud and recorded on a remote server. Subsequent review of the A/V footage could aid law enforcement in capturing perpetrators of home burglaries and other crimes. Further, the presence of one or more lighting/surveillance devices on the exterior of a home would act as a powerful deterrent against would-be burglars. Some of the present embodiments may enable the user to remotely control light and/or sound emitted from the floodlight controllers, which may further enhance the ability of the present floodlight controllers to scare away intruders.

In a first aspect, a method is provided that communicatively links a plurality of lighting devices installed at a property, each of the lighting devices comprises a floodlight controller having audio/video (A/V) recording and communication capabilities and an associated floodlight device having one or more floodlights, the method comprising, receiving a signal from a first floodlight controller in the plurality of floodlight controllers, wherein the signal is received when the first floodlight controller detects motion in an area about the first floodlight controller; and upon receiving the signal, sending an activation signal to at least a second floodlight controller in the plurality of floodlight controllers, wherein, upon receiving the activation signal, the second floodlight controller turns on at least one floodlight of the floodlight device associated with the second floodlight controller.

In an embodiment of the first aspect, the first floodlight controller also turns on at least one floodlight of the floodlight device associated with the first floodlight controller.

Another embodiment of the first aspect further receives, from the first floodlight controller, video images of a field of view of a video camera of the first floodlight controller.

Another embodiment of the first aspect further receives, from the first floodlight controller, audio from the area about the first floodlight controller, wherein the audio is captured by a microphone of the first floodlight controller.

Another embodiment of the first aspect further establishes a two-way audio communication session between a person that is a source of the detected motion by the first floodlight controller and a user located remotely from the first floodlight controller.

In another embodiment of the first aspect, the communication session enables the user to speak to the person through a client device of the user.

Another embodiment of the first aspect further transmits video images of the person to a client device of the user.

Another embodiment of the first aspect further receives, from the second floodlight controller, after sending the activation signal to the second floodlight controller, video images of a field of view of a video camera of the second floodlight controller.

In another embodiment of the first aspect, the first and second floodlight controllers communicate with each other through a user's network.

In another embodiment of the first aspect, the first and second floodlight controllers are installed at two different locations of the property.

In another embodiment of the first aspect, the first and second floodlight controllers are defined to be linked to each other by a user.

In a second aspect, a first lighting device in a plurality of lighting devices is provided, the first lighting device comprising, a floodlight device having at least one floodlight, and a floodlight controller comprising a camera including an image sensor and having a field of view, the camera being configured to detect motion within the field of view and to capture video images; a set of motion sensors configured to detect motion in an area about the first lighting device; and a processor operatively connected to the camera and operatively connected to the set of motions sensors, wherein the processor is configured to (i) receive an input indicating that motion is detected, and (ii) upon receiving the input, send an output to a server for activating a second lighting system in the plurality of lighting devices.

In an embodiment of the second aspect, the processor is configured to send the output to the server as an input signal for the server, and wherein the server upon receiving the input signal, sends an activation signal to the second lighting system to activate the second lighting system.

In another embodiment of the second aspect, the input indicating that the motion is detected is received from at least one motion sensor in the set of motion sensors.

In another embodiment of the second aspect, the first and second lighting systems are installed at two different locations of a property.

In another embodiment of the second aspect, the floodlight controller is a first floodlight controller, wherein the second lighting system comprises a second floodlight controller, and wherein the first and second floodlight controllers communicate with each other through a user's network.

In another embodiment of the second aspect, the second floodlight controller also comprises a processor that is configured to transmit video images captured by a camera of the second floodlight controller to the user's network when the second lighting system is activated.

In another embodiment of the second aspect, the first and second lighting systems in the plurality of lighting systems are defined to be linked to each other by a user.

In another embodiment of the second aspect, the processor is further configured to send, upon receiving the input, another output to the floodlight device to turn on the at least one floodlight.

In another embodiment of the second aspect, the floodlight controller further comprises a speaker that is configured to provide an audible warning, and wherein the processor is further configured to send, upon receiving the input, anther output to the speaker to provide the audible warning.

In another embodiment of the second aspect, the second lighting system also comprises a floodlight device having a set of floodlights, wherein when the second lighting system is activated, the set of floodlights is turned on.

In another embodiment of the second aspect, the floodlight controller further comprises a communication module including a wireless transceiver, the communication module being configured to establish a two-way audio communication session between a first person that is a source of the motion and a second person located remotely from the first lighting device.

In another embodiment of the second aspect, the communication session enables the second person to speak to the first person through a client device of the second person.

In another embodiment of the second aspect, the processor is further configured to transmit video images of the first person captured by the camera to a client device of the second person.

In another embodiment of the second aspect, the set of motion sensors comprises a set of passive infrared (PIR) sensors.

In another embodiment of the second aspect, the set of motion sensors comprises a set of PIRs is configured to detect motion in an area of about 270 degrees around the first lighting system.

In a third aspect, for a first lighting device in a plurality of lighting devices, a method is provided, the method for communicatively linking the first lighting device to one or more lighting devices in the plurality of lighting devices, the method comprising receiving a motion detection signal, and upon receiving the motion detection signal, sending an activation signal to a server to activate at least a second lighting device in the plurality of lighting devices.

In an embodiment of the third aspect, the motion detection signal is received from at least one motion sensor of the first lighting device.

Another embodiment of the third aspect further, upon receiving the motion detection signal, transmits video images captured by a video camera of the first lighting device to a remote client device.

Another embodiment of the third aspect further, upon receiving the motion detection signal, turns on a set of floodlights of the first lighting device.

Another embodiment of the third aspect further, upon receiving the motion detection signal, transmits audio from an area about the first lighting device captured by a microphone of the first lighting device.

In another embodiment of the third aspect, the motion detection signal is received when at least one motion sensor of the first lighting device detects a visitor at an area about the first lighting device, the method further comprising establishing a two-way audio communication session between the visitor and a user located remotely from the first lighting device.

In another embodiment of the third aspect, the communication session enables the user to speak to the visitor through a client device of the user.

Another embodiment of the third aspect further transmits video images of the person to a client device of the user.

In another embodiment of the third aspect, the first and second lighting systems communicate with each other through a user's network.

In another embodiment of the third aspect, the first and second lighting systems are installed at two different locations of a property.

In another embodiment of the third aspect, the first and second lighting systems are defined to be linked to each other by a user.

In another embodiment of the third aspect, when activated, the second lighting device turns on a set of floodlights of the second lighting device.

In another embodiment of the third aspect, when activated, the second lighting device transmits video images captured by a video camera of the second lighting device to a remote client device.

BRIEF DESCRIPTION OF THE DRAWINGS

The various embodiments of the present communication-linked floodlight controllers with audio/video (A/V) recording and communication features now will be discussed in detail with an emphasis on highlighting the advantageous features. These embodiments depict the novel and non-obvious communication-linked floodlight controllers with A/V recording and communication features shown in the accompanying drawings, which are for illustrative purposes only. These drawings include the following figures, in which like numerals indicate like parts.

DETAILED DESCRIPTION

Figure 1:
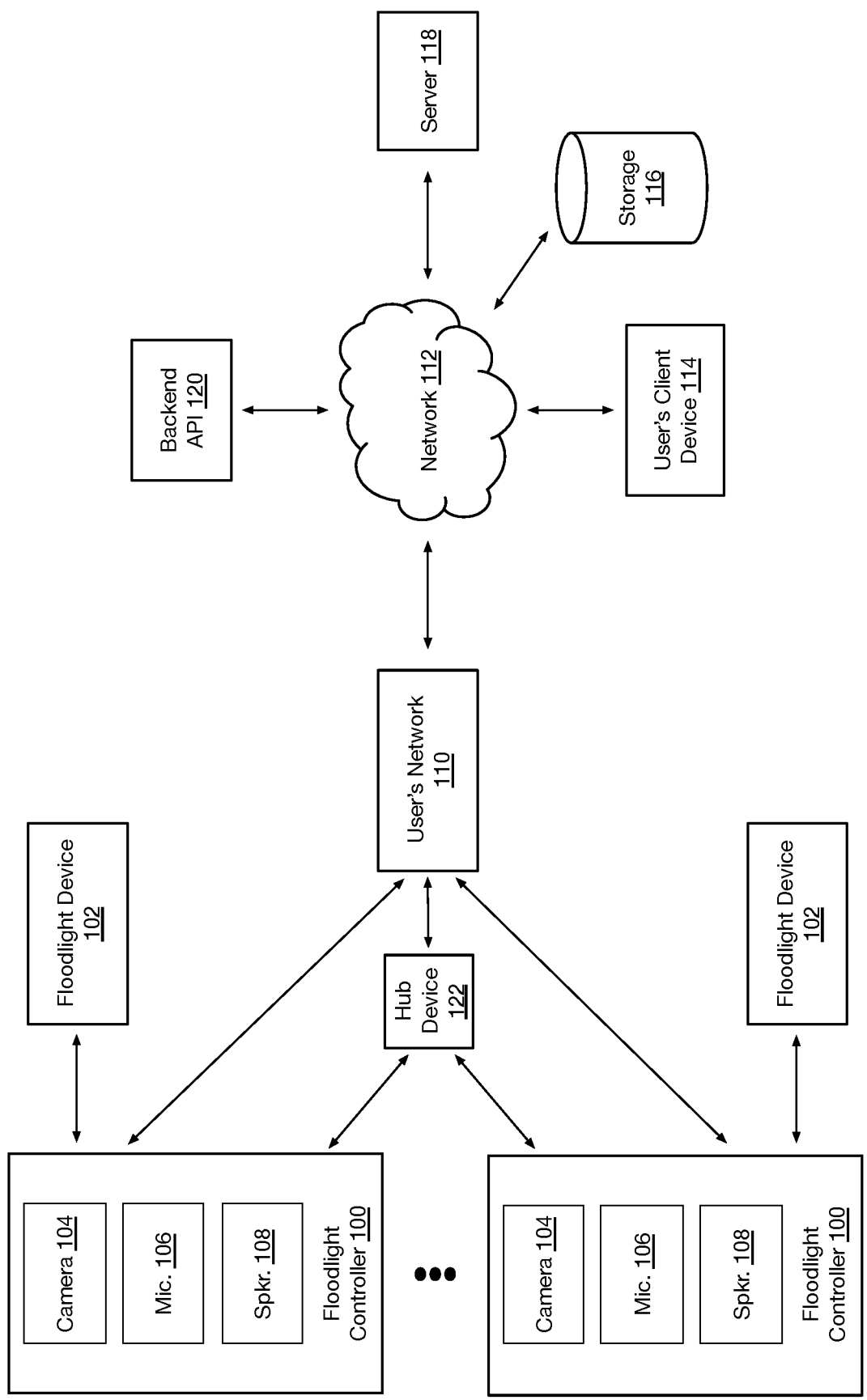
FIG. 1 is a functional block diagram illustrating a network of devices including a plurality of communication-linked floodlight controllers with A/V recording and communication features, according to the present embodiments.

The following detailed description describes the present embodiments with reference to the drawings. In the drawings, reference numbers label elements of the present embodiments. These reference numbers are reproduced below in connection with the discussion of the corresponding drawing features.

The embodiments of the present communication-linked floodlight controllers with audio/video (A/V) recording and communication features (e.g., floodlight controllers that can communicate with each other) are described below with reference to the figures. These figures, and their written descriptions, indicate that certain components of the apparatus are formed integrally, and certain other components are formed as separate pieces. Those of ordinary skill in the art will appreciate that components shown and described herein as being formed integrally may in alternative embodiments be formed as separate pieces. Those of ordinary skill in the art will further appreciate that components shown and described herein as being formed as separate pieces may in alternative embodiments be formed integrally. Further, as used herein the term integral describes a single unitary piece.

Many properties, such as homes and businesses, include outdoor security lighting. A typical outdoor security lighting device includes one or more floodlights and a motion sensor that illuminates the floodlights when motion is detected. Outdoor security lighting devices can thus deter crime by scaring away intruders who are startled by the sudden unexpected illumination that happens when the motion sensor of the outdoor security lighting device detects the intruder's motion.

The deterrent effect of typical outdoor security lighting devices is, however, limited. A determined criminal is unlikely to be deterred by simple illumination alone, particularly when the criminal believes that the property is currently unoccupied. The present embodiments enhance the deterrent effect of outdoor security lighting devices by adding audio and video capabilities. For example, some of the present embodiments include a camera and a communication module (e.g., a wireless communication module) that enables a user to receive live streaming video, using a computing device such as a smartphone, of an intruder within the field of view of the camera. The user can thus observe the intruder even when the user is not at home (or present at whatever type of property where the camera is located). Some of the present embodiments also include a speaker that enables the user to speak to the intruder. The user can thus provide live, verbal warnings to the intruder, thereby creating the illusion that the user is on the property even when the user is somewhere else. In addition to the user's live verbal warning, some of the present embodiments may automatically provide audible, pre-recorded verbal warnings (or any other audible warning) upon detection of an intruder (or a visitor). If the intruder is fooled into believing that the property owner is present, he or she is more likely to flee. Footage captured by the camera, in addition to being streamed to the user's computing device, may also be uploaded to the cloud and later used to identify, apprehend, and/or convict the intruder. Some of the present embodiments include a camera, a wireless communication module, a speaker, and other components in a compact unit that can be connected to existing outdoor security lighting devices. For example, some of the present embodiments may be integrated into existing outdoor security lighting devices as a replacement for the motion sensor.

The present embodiments further address shortcomings of conventional exterior lighting devices by providing communication linking between a plurality of lighting devices (e.g., floodlight devices that are paired with A/V recording and communication controllers) installed at a property (e.g., across a wide area of the property). Thus, in some of the present embodiments, when one of the lighting devices is activated, at least one of the other lighting devices is also automatically activated, and in some embodiments, all of the other lighting devices at the property are also activated. Simultaneous (or near simultaneous) activation of multiple lighting devices that are distributed over a wide area of a property makes it almost impossible for an intruder to quickly change his or her position (in response to activation of the first lighting device that detects the intruder) to hide in a darker spot. Furthermore, when the lighting devices are activated at the same time, the intruder can be uninterruptedly surveilled (e.g., by the other activated lighting devices) regardless of how quickly he/she changes his/her position.

With reference to FIG. 1, the present embodiments include a plurality of floodlight controllers 100 with A/V recording and communication features. Each one of the floodlight controllers 100 is configured for use with a floodlight device 102 including one or more floodlights (shown in later figures). The pairs of floodlight controller 100 and floodlight device 102 may be located on or around the exterior of a structure (not shown), such as a dwelling, a business, a storage facility, etc. One or more pairs of floodlight controller 100 and floodlight device 102 may also be located within the interior of a structure (not shown), such as a dwelling, a business, a storage facility, etc.

As described in detail below, the floodlight controller 100 is configured to activate (illuminate) the floodlights of the floodlight device 102 when motion is detected in the area about the floodlight controller 100. The floodlight controller 100 is further configured to record video from the area about the floodlight controller 100, and in some embodiments may also enable two-way audio communication between a first person in the area about the floodlight controller 100 and a second person located remotely from the area about the floodlight controller 100.

With reference to FIG. 1, each floodlight controller 100 includes a camera 104, a microphone 106, and a speaker 108. The camera 104 may comprise, for example, a high definition (HD) video camera, such as one capable of capturing video images at an image display resolution of 1080p or better. While not shown in FIG. 1, the floodlight controller 100 may also include other hardware and/or components, such as a housing, one or more motion sensors (and/or other types of sensors), a wireless communication module, etc. One or more of these other hardware and/or components are described below with reference to FIG. 3 et al.

With further reference to FIG. 1, in some of the present embodiments, the floodlight controllers 100 may communicate with a hub device 122. In some of the present embodiments, the hub device 122 may comprise any device that facilitates communication between the floodlight controllers 100 (as well as between other electronic devices that are not shown in the figure, such as alarm devices and/or smart devices). For example, the hub device 122 may be a component of a security system and/or a home automation system. The hub device 122 may be coupled to a network, such as the user's network 110. Instead of, or in addition to, the hub device 122, the floodlight controllers 100 may directly communicate with the user's network 110 (e.g., a wired and/or wireless network) in some of the present embodiments. If the user's network 110 is wireless, or includes a wireless component, the network 110 may be a Wi-Fi network compatible with the IEEE 802.11 standard and/or other wireless communication standard(s). The user's network 110 is connected to another network 112, which may comprise, for example, the Internet and/or a public switched telephone network (PSTN). As described below, the floodlight controllers 100 may communicate with a user's client device 114 via the user's network 110 and the network 112 (Internet/PSTN). The user's client device 114 may comprise, for example, a mobile telephone (may also be referred to as a cellular telephone), such as a smartphone, a personal digital assistant (PDA), a computer (e.g. tablet, laptop, desktop, etc.), or another communication device. The user's client device 114 comprises a display (not shown in FIG. 1) and related components capable of displaying streaming and/or recorded video images. The user's client device 114 may also comprise a speaker and related components capable of broadcasting streaming and/or recorded audio, and may also comprise a microphone. In some of the present embodiments, a user may control the floodlight controllers 100 directly and/or through the hub device 122 (e.g., using the client device 114). The floodlight controllers 100 may also communicate with one or more remote storage device(s) 116 (may be referred to interchangeably as "cloud storage device(s)"), one or more servers 118, and/or a backend API (application programming interface) 120 via the user's network 110 and the network 112 (Internet/PSTN). While FIG. 1 illustrates the storage device 116, the server 118, and the backend API 120 as components separate from the network 112, it is to be understood that the storage device 116, the server 118, and/or the backend API 120 may be considered to be components of the network 112.

The network 112 may be any wireless network or any wired network, or a combination thereof, configured to operatively couple the above mentioned modules, devices, and systems as shown in FIG. 1. For example, the network 112 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1, or E3 line, a Digital Data Service (DDS)

connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access), TDMA (Time Division Multiple Access), FDMA (Frequency Division Multiple Access), and/or OFDMA (Orthogonal Frequency Division Multiple Access) cellular phone networks, GPS, CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-1394 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

According to one or more aspects of the present embodiments, when a person (may be referred to interchangeably as "visitor") enters the area about one of the floodlight controllers 100 (referred to hereinafter as "first floodlight controller 100"), the first floodlight controller 100 detects the visitor's presence. The first floodlight controller 100 may detect the visitor's presence using the camera 104 and/or a motion sensor, as described below. The camera 104 may capture video images within a field of view of the camera 104, and may thereby capture video images of the visitor. The video recording/capture may begin when the visitor is detected, or may begin earlier, as described below. The first floodlight controller 100 may also capture audio through the microphone 106.

In some embodiments, the camera 104 may have zoom and/or panning functionality, such as digital zoom and/or panning, to enable the camera 104 to focus the field of view onto an area of interest and/or to magnify the area of interest. The zooming and/or panning may, in some embodiments, be controlled by the user through the user's client device 114. Also in some embodiments, the camera 104 may have "smart" zoom and/or panning functionality, to enable the camera 104 to automatically focus and/or magnify the field of view onto a person or persons, and/or to follow the movement of the person(s) as they move about within the camera's field of view. For example, the camera 104 may be capable of detecting a human face and automatically focusing and/or magnifying the field of view onto the detected human face (or faces), and/or following the movement of the detected human face (or faces). In another example, the camera 104 may be capable of distinguishing a human in its field of view from a non-human object in its field of view. The camera 104 may further be configured to detect and/or track the movement of any detected humans, while ignoring any detections of non-human objects in its field of view.

In response to the detection of the visitor, the first floodlight controller 100 is activated and turns on at least one floodlight of the associated floodlight device 102 to illuminate the area about the first floodlight controller 100. The activated first floodlight controller 100 may also send a signal to one or more other floodlight controllers 100 to activate them as well, even if the other floodlight controllers 100 have not detected any motion yet and/or are in an inactive mode. As described below with reference to FIG. 2, the activated floodlight controller 100 may directly send an activation signal to the other floodlight controllers 100 to activate them in some aspects of the present embodiments, or in some other aspects of the present embodiment, the first floodlight controller 100 may activate the other floodlight controllers 100 through another backend device, such as the server 118, or the backend API 120. In yet, some other aspects of the present embodiments, the first floodlight controller 100 may send the activation signal to the hub device 122 (which is connected to the same user's network 110), and the hub device, in response to receiving the activation signal, may activate the other floodlight controllers 100. In one aspect of the present embodiments, after receiving an activation signal, the other floodlight controllers 100 may turn on one or more floodlights of their corresponding floodlight devices 102. In some other aspects of the present embodiments, the other floodlight controllers 100, in addition to illuminating their corresponding floodlight devices 102, may also start recording video images and/or audio data.

The first floodlight controller 100 also sends an alert to the user's client device 114 (FIG. 1) via the user's network 110 and the network 112 to inform the user about the presence of a visitor (or an intruder). The first floodlight controller 100 may also send streaming video and/or audio to the user's client device 114 via the user's network 110 and the network 112. If the user answers the alert, two-way audio communication may then occur between the visitor and the user through the first floodlight controller 100 and the user's client device 114. The user may view the visitor throughout the duration of the communication, but the visitor cannot see the user.

The video images captured by the camera 104 of the first floodlight controller 100 (and the audio captured by the microphone 106) may be uploaded to the cloud and recorded on the remote storage device 116 (FIG. 1). In some embodiments, the video and/or audio may be recorded on the remote storage device 116 even if the user chooses to ignore the alert sent to his or her client device 114. As described above, in some embodiments the camera 104 may have "smart" zoom and/or panning functionality. For example, the camera 104 may be capable of facial recognition, enabling the camera 104 to automatically focus and/or magnify the field of view onto a person's face, and/or to follow the movement of the person(s) as they move about within the camera's field of view. If the person in the field of view of the camera 104 is an intruder, video images of the person's face may be useful in identifying the intruder, which may help lead to the capture of the intruder. In another example, the camera 104 may be capable of distinguishing a human in its field of view from a non-human object in its field of view. The camera 104 may further be configured to detect and/or track the movement of any detected humans, while ignoring any detections of non-human objects in its field of view. In other embodiments, the zooming and/or panning functionality of the camera 104 may be controlled by the user through the user's client device 114 using an application executing on the client device 114.

With further reference to FIG. 1, the system may further comprise a backend API 120 including one or more components. A backend API (application programming interface) may comprise, for example, a server (e.g. a real server, or a virtual machine, or a machine running in a cloud infrastructure as a service), or multiple servers networked together, exposing at least one API to client(s) accessing it. These servers may include components such as application servers (e.g. software servers), depending upon what other components are included, such as a caching layer, or database layers, or other components. A backend API may, for example, comprise many such applications, each of which communicate with one another using their public APIs. In some embodiments, the backend API may hold the bulk of the user data and offer the user management capabilities, leaving the clients to have very limited state.

The backend API 120 illustrated in FIG. 1 may include one or more APIs. An API is a set of routines, protocols, and tools for building software and applications. An API expresses a software component in terms of its operations, inputs, outputs, and underlying types, defining functionalities that are independent of their respective implementations, which allows definitions and implementations to vary without compromising the interface. Advantageously, an API may provide a programmer with access to an application's functionality without the programmer needing to modify the application itself, or even understand how the application works. An API may be for a web-based system, an operating system, or a database system, and it provides facilities to develop applications for that system using a given programming language. In addition to accessing databases or computer hardware like hard disk drives or video cards, an API can ease the work of programming graphical user interface (GUI) components. For example, an API can facilitate integration of new features into existing applications (a so-called "plug-in API"). An API can also assist otherwise distinct applications with sharing data, which can help to integrate and enhance the functionalities of the applications.

The backend API 120 illustrated in FIG. 1 may further include one or more services (also referred to as network services). A network service is an application that provides data storage, manipulation, presentation, communication, and/or other capability. Network services are often implemented using a client-server architecture based on application-layer network protocols. Each service may be provided by a server component running on one or more computers (such as a dedicated server computer offering multiple services) and accessed via a network by client components running on other devices. However, the client and server components can both be run on the same machine. Clients and servers may have a user interface, and sometimes other hardware associated with them.

Figure 2:
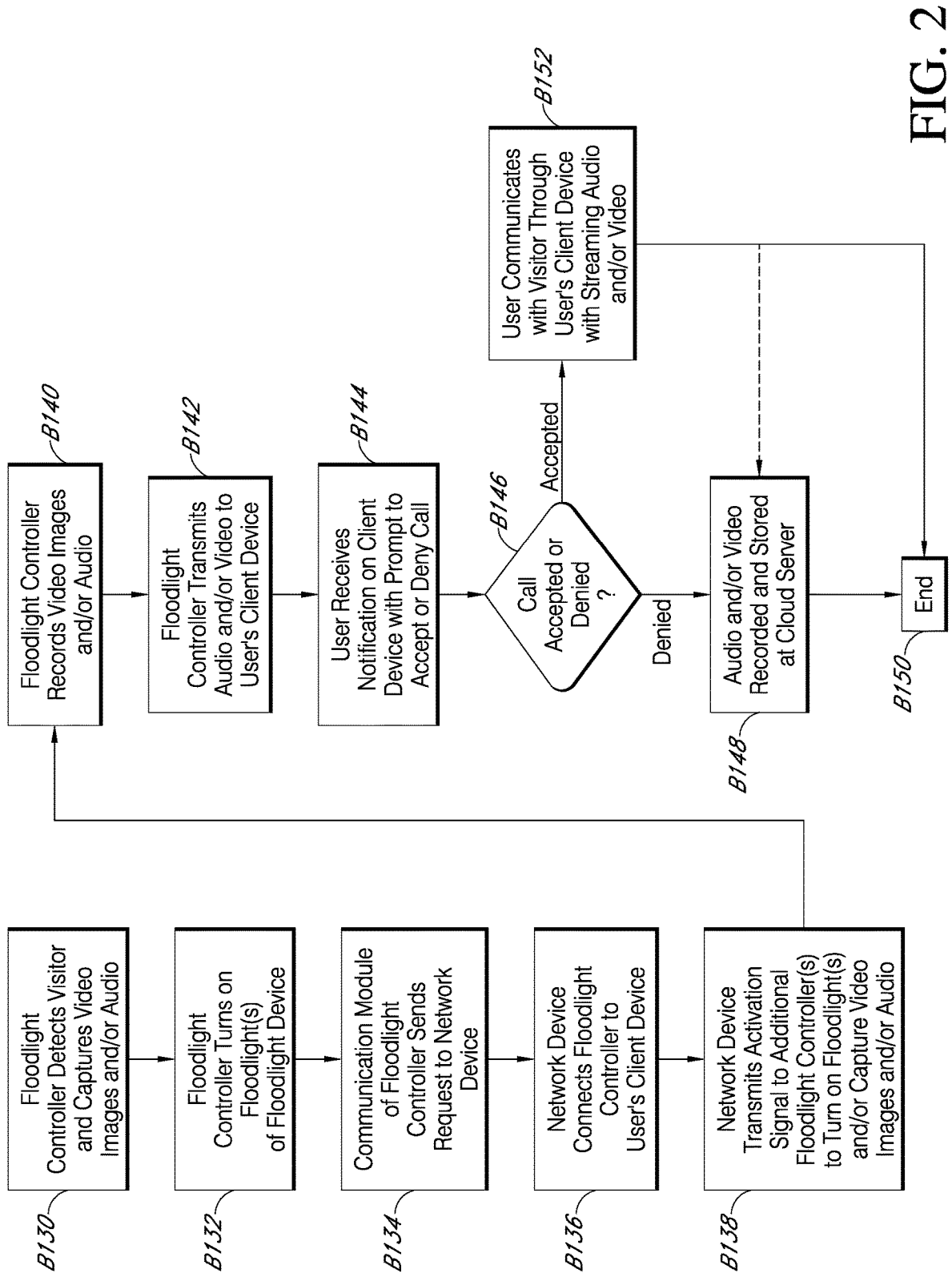
FIG. 2 is a flowchart illustrating a process for streaming and storing A/V content from one of a plurality of floodlight controllers, and for activating other communication-linked floodlight controllers, according to various aspects of the present disclosure.

For example, the backend API 120 illustrated in FIG. 2 may include a floodlight controller service. The floodlight controller service may comprise one or more floodlight controller data structures that store information about a plurality of floodlight controllers (e.g., the relationship between all of the floodlight controllers or a subset of the floodlight controllers installed at a property). The floodlight controller service may access the information in the floodlight controller data structure(s) when needed to determine which floodlight controller has sent a visitor detection signal to the backend API 120. The floodlight controller service may also maintain the information in the floodlight controller data structure(s) and update the information in the floodlight controller data structure(s) when new floodlight controllers are defined (e.g., by a user as described below with reference to FIG. 2) to be linked to the existing floodlight controllers and/or when one or more of the existing associated floodlight controllers are disassociated from a set of linked floodlight controllers.

While not shown in FIG. 1, some of the present embodiments may include one or more floodlight devices 102 having a controller that does not include at least one of a camera, a microphone, or a speaker. For example, the controller may include circuitry and/or components that enable the controller to detect motion, and circuitry and/or components that enable the controller to communicate with the other floodlight controllers 100, either directly or through the user's network 110 and/or the network 112. Such a controller may activate its associated floodlight device 102 when it detects motion, and also trigger the other floodlight controllers 100 to be activated. Conversely, such a controller may be activated to turn on its associated floodlight device 102 when one of the other floodlight controllers 100 detects motion.

Furthermore, while in the described examples activation of one floodlight controller may activate other floodlight controllers that are linked to the activated floodlight controller, in some aspects of the present embodiments activation of any other A/V recording and communication device that is associated with at least one linked floodlight controller(s) may also activate the linked floodlight controller(s). As an example, in some of the present embodiments, activation of a video doorbell (e.g., when the video doorbell detects motion) that is associated with one or more linked floodlight controllers may simultaneously activate one or more of the linked floodlight controller(s), such as all of the linked floodlight controller(s). Additionally, some aspects of the present embodiments may enable a user to activate a set of linked floodlight controllers, such as, for example, using a client device that is associated with the set of linked floodlight controllers 100 and the hub device 122. As described above, in some of the present embodiments, the user may directly activate the one or more floodlight controllers 100 using the client device 114. In some other aspects of the present embodiments, the user may activate one or more floodlight controllers 100 (using the client device 114) through the hub device 122.

FIG. 2 is a flowchart illustrating a process for streaming and storing A/V content from one of the floodlight controllers 100, and for activating other floodlight controllers 100 in response to detecting motion, according to various aspects of the present disclosure. At block B130, a floodlight controller 100 detects a visitor's presence and captures video images within a field of view of the camera 102. The floodlight controller 100 may also capture audio through the microphone 104. At block B132, the floodlight controller 100 turns on at least one floodlight of an associated floodlight device to illuminate the area about the floodlight controller 100. As described above, the floodlight controller 100 may detect the visitor's presence by detecting motion using the camera 102 and/or a motion sensor. Also as described above, the video recording/capture may begin when the visitor is detected, or may begin earlier, as described below.

At block B134, a communication module of the floodlight controller 100 sends a request, via the user's network 110 and the network 112, to a device in the network 112. For example, the network device to which the request is sent may be a server such as the server 118. The server 118 may comprise a computer program and/or a machine that waits for requests from other machines or software (clients) and responds to them. A server typically processes data. One purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes. In another example, the network device to which the request is sent may be an API such as the backend API 120, which is described above.

In response to the request, at block B136 the network device may connect the floodlight controller 100 to the user's client device 114 through the user's network 110 and the network 112. The network device may further transmit an activation signal (at Block B138) to one or more of the other floodlight controllers that are linked to the activated floodlight controller. The transmitted signal may activate the other floodlight controllers even though they have not detected the intruder's presence yet. As described above, in some of the present embodiments, a hub device, that is associated with the linked floodlight controllers, may send the activation signal to the floodlight controllers after the hub device receives an object detection signal, such as the request signal, from the first floodlight controller. When activated by the signal, in some aspects of the present embodiments, the other floodlight controllers may turn on one or more floodlights that are associated with the floodlight controllers. In addition to turning on the associated floodlights, in some other aspects of the present embodiments, the floodlight controllers may capture/record video images (that are within a field of view of their associated cameras) and/or audio.

In some of the present embodiments, when a first floodlight controller detects a presence of a person (using its motion detector(s) and/or its camera), the floodlight controller sends a signal to at least one of the other floodlight controllers that are communicatively linked to the first floodlight controller to activate the other floodlight controllers directly. That is, instead of activating the other floodlight controllers through a network device, the first-activated floodlight controller sends an activation signal directly to at least one of the other floodlight controllers (e.g., all of the other floodlight controllers) linked to the first-activated floodlight controller once the first floodlight controller is activated (e.g., once the floodlight controller detects a motion). The activation signal(s) may be sent wirelessly using a short-range communication protocol, such as Bluetooth or Bluetooth low energy (Bluetooth LE, BLE, Bluetooth Smart), and/or via a wired connection between the first floodlight controller and the other floodlight controller(s).

In some of the present embodiments, a user can define an association between a plurality of floodlight controllers that are installed at a property. For example, the user, through an application executing on the user's client device 114 (e.g., a desktop computer, a laptop computer, a smartphone, etc.), may define a relationship between all of the floodlight controllers installed at the property. Alternatively, the user may define a relationship between only a subset of the floodlight controllers. Once a relationship for a set of floodlight controllers is defined, in some of the present embodiments, each time a first floodlight controller in the set is activated, all of the other floodlight controllers in the set are also activated (e.g., either directly by the first floodlight controller, or through a network device such as the server 118 or the backend API 120).

At block B140, the floodlight controller 100 may record available audio and/or video data using the camera 102, the microphone 104, and/or any other device/sensor available. At block B142, the audio and/or video data is transmitted (streamed) from the floodlight controller 100 to the user's client device 114 via the user's network 110 and the network 112. At block B144, the user may receive a notification on his or her client device 114 with a prompt to either accept or deny the call (e.g., to accept/deny establishing a communication session with the activated floodlight controller).

The notification at the user's client device 114 may include the live streaming audio and/or video, thus enabling the user to determine whether he or she should answer the call. If, for example, the streaming video shows that a person is in the field of view of the camera, the user may wish to answer the call in order to speak with that person. In one example, the person in the field of view of the camera may be a visitor whose identity is known to the user. In such a case, the user may desire to converse with the visitor. In another example, the person in the field of view of the camera may be an intruder whose identity is not known to the user. In such a case, the user may desire to startle the intruder and encourage him or her to flee, for example, by speaking (or shouting) a warning that the intruder is being recorded and/or that law enforcement has been notified and is en route to the property where the floodlight controller 100 is located.

At block B146, the process determines whether the user has accepted or denied the call (e.g., the notification requesting to establish a communication session). If the user denies the notification, then the process advances to block B148, where the audio and/or video data is recorded and stored at a cloud server. The session then ends at block B150 and the connection between the floodlight controller 100 and the user's client device 114 is terminated. If, however, the user accepts the notification, then at block B152 the user communicates with the visitor/intruder through the user's client device 114 while audio and/or video data captured by the camera 102, the microphone 104, and/or other devices/sensors is streamed to the user's client device 114. At the end of the communication, the user may terminate the connection between the user's client device 114 and the floodlight controller 100 and the session ends at block B150. In some embodiments, the audio and/or video data may be recorded and stored at a cloud server (block B148) even if the user accepts the notification and communicates with the visitor/intruder through the user's client device 114.

As described above, one aspect of the present floodlight controller includes the realization that exterior lighting devices may be improved by adding audio/video (A/V) recording and communication capabilities. For example, when a motion sensor of an exterior lighting device detects an intruder, the lights may be activated, which may startle the intruder. But the intruder is likely to be further startled, and thus more likely to flee, if he or she hears the sound of a human voice. Thus, it would be advantageous to provide a floodlight controller for an exterior lighting device having a camera that enables the property owner (or renter) to see a live view of the area near the lighting device, and a speaker that enables the property owner (or renter) to provide a live verbal warning to any intruders. The present embodiments provide these advantages. The present embodiments further advantageously upload audio and/or video captured by the floodlight controller to the cloud for recording on a remote server. The A/V footage is useful to law enforcement in capturing perpetrators of home burglaries and other crimes. Further, the presence of the floodlight controller on the exterior of a home acts as a powerful deterrent against would-be burglars.

Embodiments of the present floodlight controller are advantageously configured to be connected to the existing household AC power supply. The camera of the present floodlight controller can thus be powered on continuously.

Because the camera is able to be powered on continuously, it can always be recording, and recorded footage can be continuously stored in a rolling buffer or sliding window. In some embodiments, about 10-15 seconds of recorded footage can be continuously stored in the rolling buffer or sliding window. Also because the camera is able to be powered on continuously, it can be used for motion detection. The camera can thus supplement the functionality of a separate motion detection device, such as a passive infrared (PIR) sensor, or eliminate the need for a separate motion detection device. Also because the camera is able to be powered on continuously, it can be used as a light detector for use in controlling the current state of the IR cut filter and turning the IR LED on and off. The camera can thus supplement the functionality of a separate photosensor, or eliminate the need for a separate photosensor.

Figure 3:
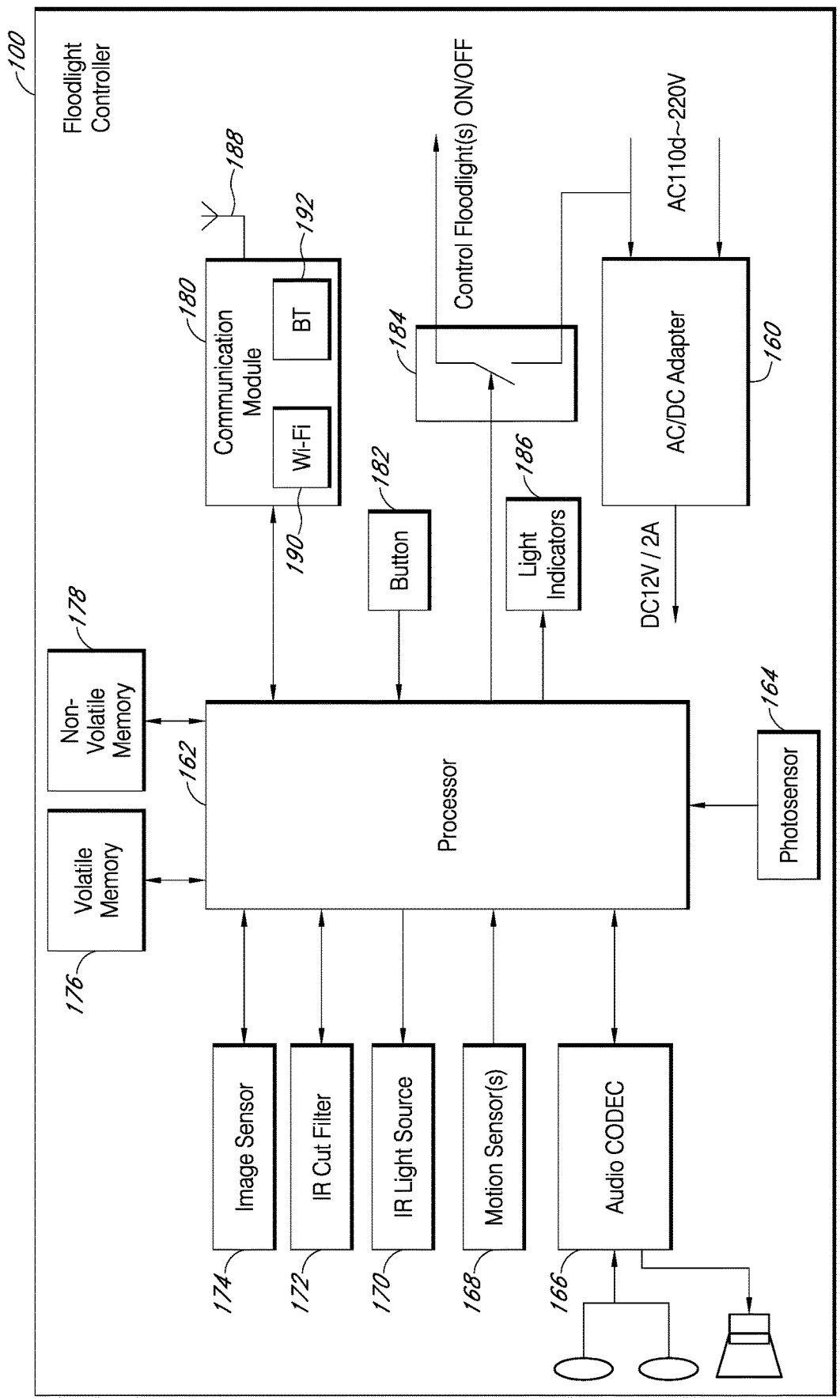
FIG. 3 is a functional block diagram of one embodiment of a floodlight controller with A/V recording and communication features, according to the present disclosure.

FIGS. 3-10 illustrate one embodiment of the floodlight controller 100, according to various aspects of the present disclosure. FIG. 3 is a functional block diagram illustrating various components of the floodlight controller 100 and their relationships to one another. For example, the floodlight controller 100 comprises an AC/DC adapter 160. The floodlight controller 100 is thus configured to be connected to a source of external AC (alternating-current) power, such as a household AC power supply (may also be referred to as AC mains). The AC power may have a voltage in the range of 110-220 VAC, for example. The incoming AC power may be received by the AC/DC adapter 160, which may convert the incoming AC power to DC (direct-current) and may step down the voltage from 110-220 VAC to a lower output voltage of about 12 VDC and an output current of about 2 A, for example. In various embodiments, the output of the AC/DC adapter 160 may be in a range of from about 9 V to about 15 V, for example, and in a range of from about 0.5 A to about 5 A, for example. These voltages and currents are only examples provided for illustration and are not limiting in any way.

With further reference to FIG. 3, the floodlight controller 100 further comprises other components, including a processor 162 (may also be referred to as a controller), a photosensor 164, an audio CODEC (coder-decoder) 166, the at least one speaker 108, the at least one microphone 106, at least one motion sensor 168, an infrared (IR) light source 170, an IR cut filter 172, an image sensor 174 (may be a component of the camera 104, and may be referred to interchangeably as the camera 104), volatile memory 176, non-volatile memory 178, a communication module 180, a button 182, a switch 184 for controlling one or more floodlights, and a plurality of light indicators 186. Each of these components is described in detail below.

With further reference to FIG. 3, the processor 162 may perform data processing and various other functions, as described below. The processor 162 may comprise an integrated circuit including a processor core, the volatile memory 176, the non-volatile memory 178, and/or programmable input/output peripherals (not shown). The volatile memory 176 may comprise, for example, DDR3 SDRAM (double data rate type three synchronous dynamic random-access memory). The non-volatile memory 178 may comprise, for example, NAND flash memory. In the embodiment illustrated in FIG. 3, the volatile memory 176 and the non-volatile memory 178 are illustrated outside the box representing the processor 162. The embodiment illustrated in FIG. 3 is, however, merely an example, and in some embodiments the volatile memory 176 and/or the non-volatile memory 178 may be physically incorporated with the processor 162, such as on the same chip. The volatile memory 176 and/or the non-volatile memory 178, regardless of their physical location, may be shared by one or more other components (in addition to the processor 162) of the present floodlight controller 100.

With further reference to FIG. 3, the image sensor 174 (camera 104), the IR light source 170, the IR cut filter 172, and the photosensor 164 are all operatively coupled to the processor 162. As described in detail below, the IR light source 170 and the IR cut filter 172 facilitate "night vision" functionality of the camera 104. For example, the photosensor 164 is configured to detect the level of ambient light about the floodlight controller 100. The processor 162 uses the input from the photosensor 164 to control the states of the IR light source 170 and the IR cut filter 172 to activate and deactivate night vision, as described below. In some embodiments, the image sensor 174 may comprise a video recording sensor or a camera chip. In some embodiments, the IR light source 170 may comprise one or more IR light-emitting diodes (LEDs).

With further reference to FIG. 3, the at least one speaker 108 and the at least one microphone 106 are operatively coupled to the audio CODEC 166, which is operatively coupled to the processor 162. The transfer of digital audio between the user and a visitor (or intruder) may be compressed and decompressed using the audio CODEC 166, as described below. The motion sensor(s) 168 is also operatively coupled to the processor 162. The motion sensor(s) 168 may comprise, for example, passive infrared (PIR) sensors, or any other type of sensor capable of detecting and communicating to the processor 162 the presence and/or motion of an object within its field of view. When the processor 162 is triggered by the motion sensor(s) 168, the processor 162 may perform one or more functions, as described below.

With further reference to FIG. 3, the communication module 180 is operatively coupled to the processor 162. The communication module 180, which includes at least one antenna 188, is configured to handle communication links between the floodlight controller 100 and other, external devices or receivers, and to route incoming/outgoing data appropriately. For example, inbound data from the antenna(s) 188 may be routed through the communication module 180 before being directed to the processor 162, and outbound data from the processor 162 may be routed through the communication module 180 before being directed to the antenna(s) 188. The communication module 180 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, Bluetooth, or any other protocol and/or technology. In the illustrated embodiment, the communication module 180 includes a Wi-Fi chip 190 and a Bluetooth chip 192, but these components are merely examples and are not limiting. Further, while the Wi-Fi chip 190 and the Bluetooth chip 192 are illustrated within the box representing the communication module 180, the embodiment illustrated in FIG. 3 is merely an example, and in some embodiments the Wi-Fi chip 190 and/or the Bluetooth chip 192 are not necessarily physically incorporated with the communication module 180.

In some embodiments, the communication module 180 may further comprise a wireless repeater (not shown, may also be referred to as a wireless range extender). The wireless repeater is configured to receive a wireless signal from a wireless router (or another network device) in the user's network 110 and rebroadcast the signal. Wireless devices that are not within the broadcast range of the wireless router, or that only weakly receive the wireless signal from the wireless router, may receive the rebroadcast signal from the wireless repeater of the communication module 180, and may thus connect to the user's network 110 through the floodlight controller 100. In some embodiments, the wireless repeater may include one or more transceiver modules (not shown) capable of transmitting and receiving data, and using, for example, one or more protocols and/or technologies, such as Wi-Fi (IEEE 802.11), WiMAX (IEEE 802.16), or any other protocol and/or technology.

With further reference to FIG. 3, when a visitor (or intruder) who is present in the area about the floodlight controller 100 speaks, audio from the visitor (or intruder) is received by the microphone(s) 106 and compressed by the audio CODEC 166. Digital audio data is then sent through the communication module 180 to the network 112 (FIG. 1) via the user's network 110, routed by the server 118 and/or the API 120, and delivered to the user's client device 114. When the user speaks, after being transferred through the network 112, the user's network 110, and the communication module 180, the digital audio data from the user is decompressed by the audio CODEC 166 and emitted to the visitor through the speaker 108, which may be driven by a speaker 108 driver (not shown).

With further reference to FIG. 3, the button 182 is operatively coupled to the processor 162. The button 182 may have one or more functions, such as changing an operating mode of the floodlight controller 100 and/or triggering a reset of the floodlight controller 100. For example, when the button 182 is pressed and released, it may cause the communication module 180 of the floodlight controller 100 to enter access point (AP) mode, which may facilitate connecting the floodlight controller 100 to the user's network 110. Alternatively, or in addition, when the button 182 is pressed and held down for at least a threshold amount of time, it may trigger the erasing of any data stored at the volatile memory 176 and/or at the non-volatile memory 178, and/or may trigger a reboot of the processor 162.

Figure 4:
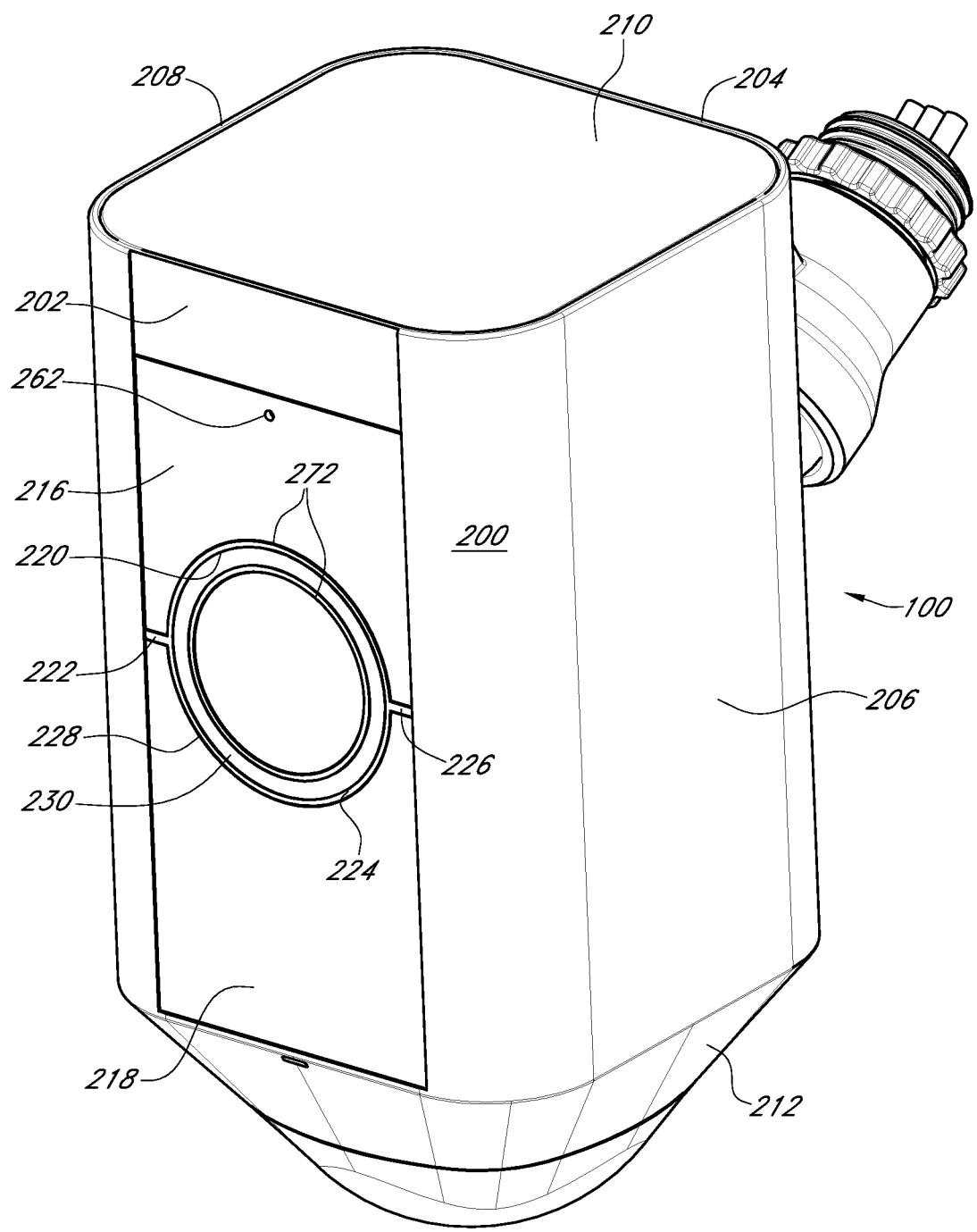
FIG. 4 is an upper front perspective view of one embodiment of a floodlight controller with A/V recording and communication features, according to the present disclosure.
Figure 5:
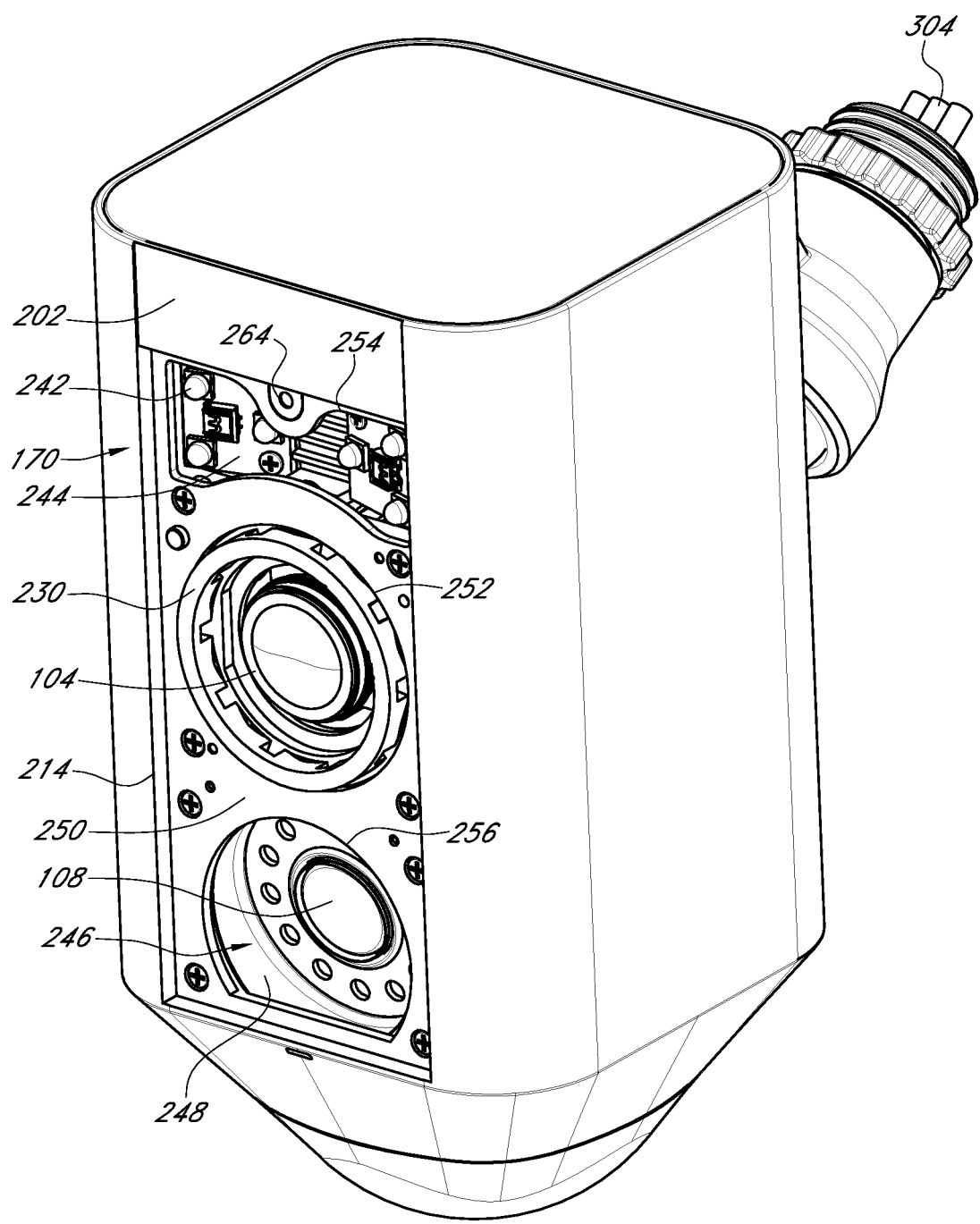
FIG. 5 is an upper front perspective view of the floodlight controller with A/V recording and communication features of FIG. 4 with some front-facing components removed.

With reference to FIG. 4, the floodlight controller 100 comprises a housing 200 for containing and protecting the interior components of the floodlight controller 100. The housing 200 includes a front wall 202, a rear wall 204, opposing side walls 206, 208, an upper wall 210, and a tapered lower portion 212. With reference to FIGS. 4 and 5, the front wall 202 includes a central opening 214 (FIG. 5) that receives an upper shield 216 and a lower grill 218 (FIG. 4). In the illustrated embodiment, front surfaces of the upper shield 216 and the lower grill 218 are substantially flush with a front surface of the front wall 202, but in alternative embodiments these surfaces may not be flush with one another. With reference to FIG. 4, the upper shield 216 is substantially rectangular, and includes a semicircular indentation 220 along its lower edge 222. The lower grill 218 is substantially rectangular, and includes a semicircular indentation 224 along its upper edge 226. Together, the semicircular indentations 220, 224 in the upper shield 216 and the lower grill 218 form a circular opening 228 that accommodates a light pipe 230. A cover 232 extends across and closes an outer open end of the light pipe 230. The upper shield 216, the lower grill 218, the light pipe 230, and the cover 232 are all described in further detail below.

Figure 6:
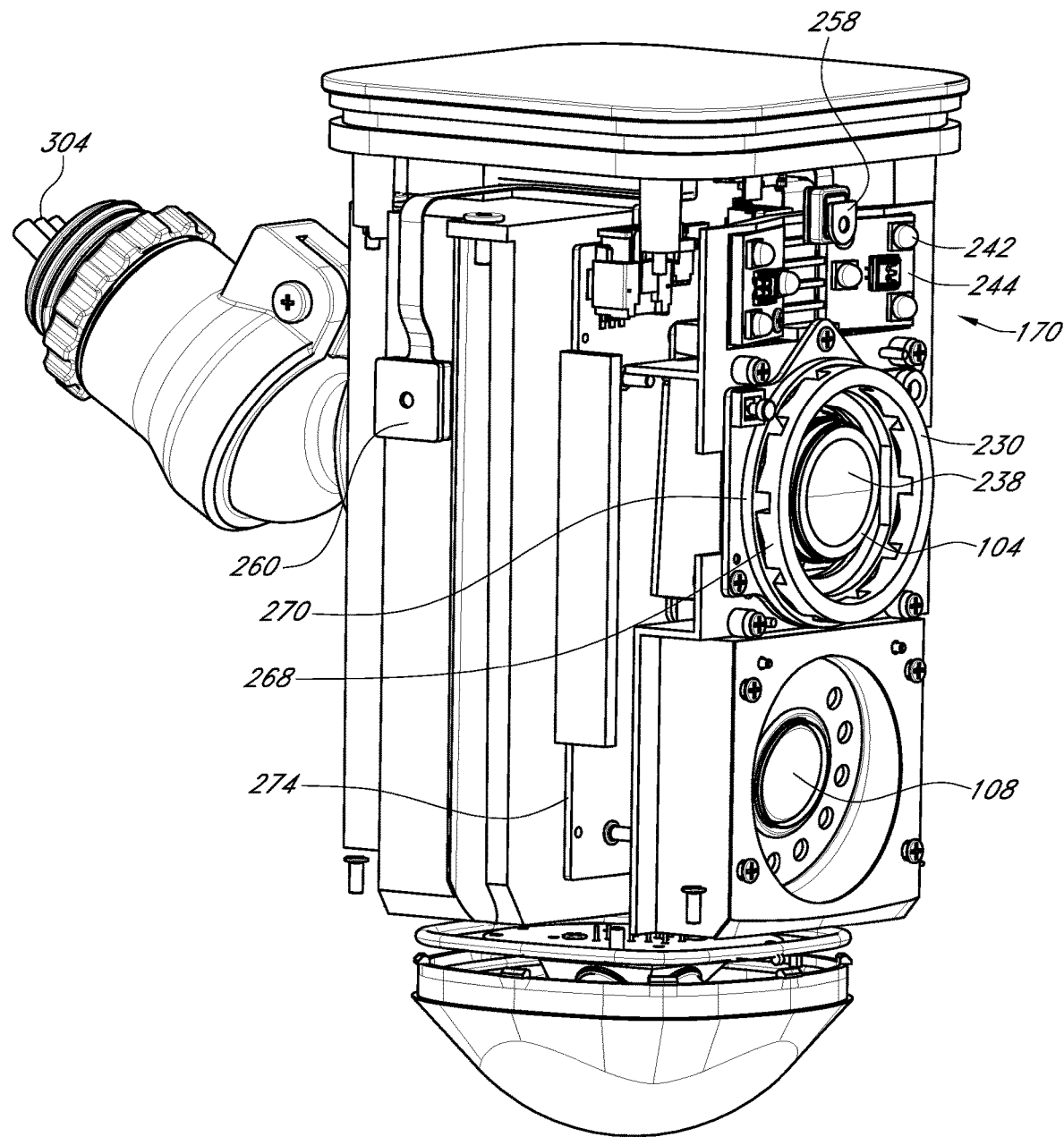
FIG. 6 is a front left-side perspective view of the floodlight controller with A/V recording and communication features of FIG. 4 with some outer components removed.

With reference to FIGS. 5 and 6, the floodlight controller 100 further comprises the camera 104. The camera 104 is configured to capture video images from within its field of view. Those video images can be streamed to the user's client device 114 (FIG. 1) and/or uploaded to a remote network device, such as the storage device 116 and/or the server 118, for later viewing according to a process similar to, or the same as, that described above with reference to FIG. 2. The camera 104 is located in the circular opening 228 formed by the upper shield 216 and the lower grill 218 (FIG. 4), behind the cover 232, and is surrounded by the light pipe 230 (FIGS. 5 and 6). The cover 232 is preferably transparent or translucent so that it does not interfere with the field of view of the camera 104. For example, in certain embodiments the cover 232 may comprise colorless glass or plastic.

Figure 7:
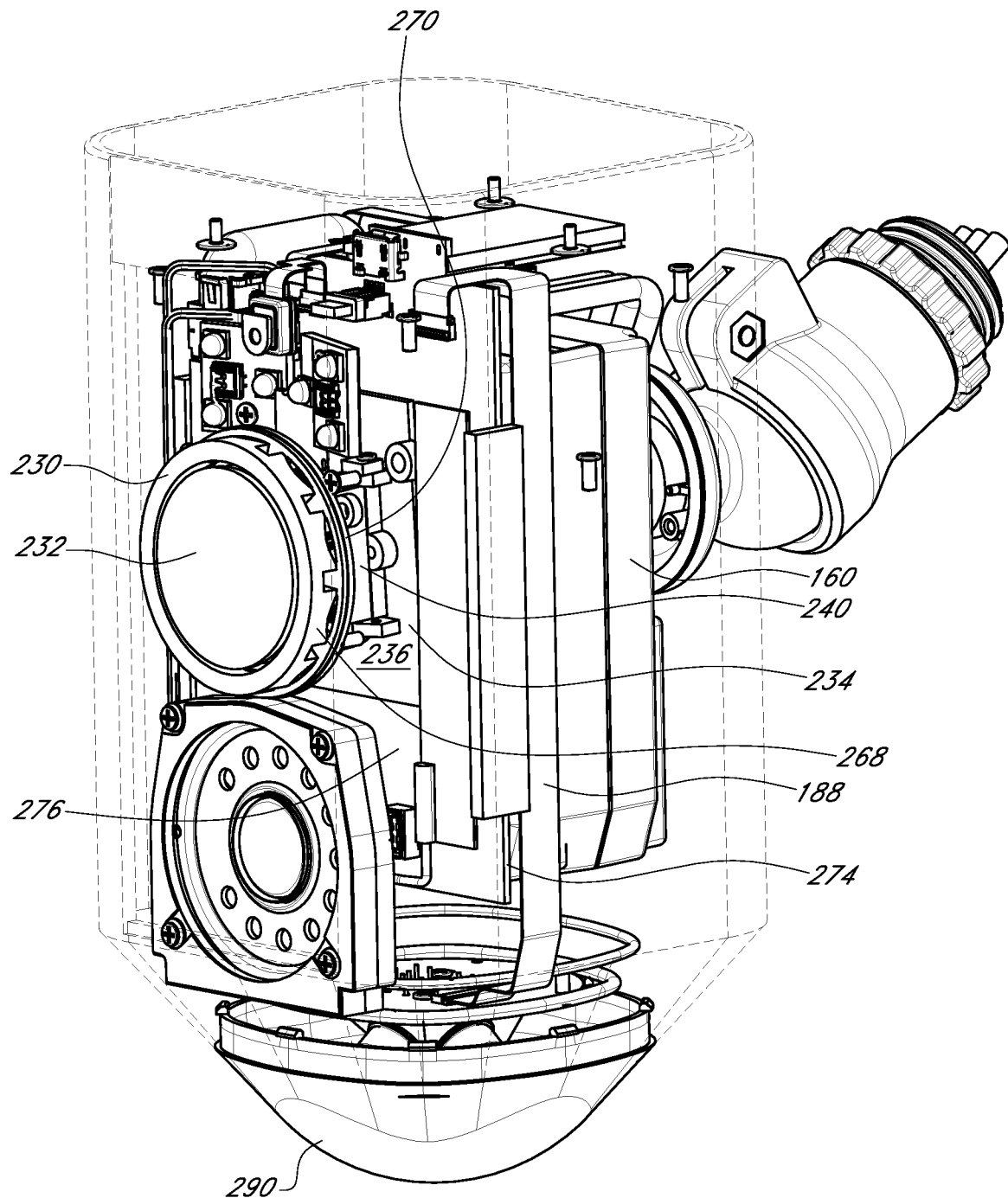
FIG. 7 is a front right-side perspective view of the floodlight controller with A/V recording and communication features of FIG. 4 with some outer components removed.

With reference to FIGS. 6 and 7, the camera 104 is coupled to a front surface 234 (FIG. 7) of a camera printed circuit board (PCB) 236, and includes a lens 238 (FIG. 6) and an imaging processor 240 (FIG. 7). The camera lens 238 may be a lens capable of focusing light into the camera 104 so that clear images may be captured. The camera 104 may comprise, for example, a high definition (HD) video camera, such as one capable of capturing video images at an image display resolution of 1080p or better. In certain of the present embodiments, the camera 104 may be used to detect motion within its field of view, as described below.

With reference to FIGS. 5 and 6, the floodlight controller 100 further comprises the infrared (IR) light source 170. In the illustrated embodiment, the IR light source 170 is located within the central opening 214 (FIG. 5) of the front wall 202, above the camera 104, and comprises a plurality of IR light-emitting diodes (LEDs) 242 coupled to a pair of IR LED printed circuit boards (PCBs) 244. With reference to FIGS. 4 and 5, the IR LEDs 242 are located behind the upper shield 216. The upper shield 216 preferably comprises a material that is transparent to IR light, but may be partially or mostly opaque with respect to light in the visible spectrum. For example, in certain embodiments the upper shield 216 may comprise a tinted plastic, such as polycarbonate. The upper shield 216, therefore, does not significantly interfere with transmission of IR light from the IR light source 170, which is located behind the upper shield 216. As described in detail below, the IR light source 170 (in conjunction with the IR cut filter 172) facilitates "night vision" functionality of the camera 104. The illustrated configuration of the IR light source 170, having IR LED PCBs 244 with each PCB including three IR LEDs 242, is merely one example and is not limiting. In alternative embodiments, the IR light source 170 may have any number of IR LED PCBs 244 and/or IR LEDs 242. In further alternative embodiments, the IR light source 170 may not comprise any IR LED PCBs 244. For example, the IR LEDs 242 may be secured to one or more other components of the floodlight controller 100. In still further alternative embodiments, the IR light source 170 may not comprise any IR LEDs 242, but may instead comprise another type of IR light-emitting component(s).

The IR light source 170 may be triggered to activate when a low level of ambient light is detected by the photosensor 164 and/or the camera 104. When activated, IR light emitted from the IR light source 170 illuminates the camera 104's field of view. The camera 104, which may be configured to detect IR light, may then capture the IR light emitted by the IR light source 170 as it reflects off objects within the camera 104's field of view, so that the floodlight controller 100 can clearly capture images at night (may be referred to as "night vision").

As described above with reference to FIG. 3, the floodlight controller 100 further comprises the IR cut filter 172.

The IR cut filter 172 is a mechanical shutter that can be selectively positioned between the lens 238 and the image sensor 174 of the camera 104. During daylight hours, or whenever there is a sufficient amount of ambient light, the IR cut filter 172 is positioned between the lens 238 and the image sensor 174 to filter out IR light so that it does not distort the colors of images as the human eye sees them. During nighttime hours, or whenever there is little to no ambient light, the IR cut filter 172 is withdrawn from the space between the lens 238 and the image sensor 174, so that the camera 104 is sensitive to IR light ("night vision"). The processor 162 may control the current state of the IR cut filter 172 based on the input received from the photosensor 164. In some embodiments, however, the photosensor 164 may be omitted and the camera 104 may act as a light detector for use in controlling the current state of the IR cut filter 172 (and turning the IR light source 170 on and off). Using the camera 104 as a light detector is facilitated in some embodiments by the fact that the floodlight controller 100 is powered by a connection to AC mains, and the camera 104, therefore, may always be powered on.

With further reference to FIGS. 5 and 6, the floodlight controller 100 further comprises the speaker 108. In the illustrated embodiment, the speaker 108 is located within the central opening 214 (FIG. 5) of the front wall 202, below the camera 104. With reference to FIGS. 4 and 5, the speaker 108 is located behind the lower grill 218. The lower grill 218 is preferably configured to facilitate the passage of sound through the lower grill 218 so that sounds emanating from the speaker 108 are clearly audible in the area around the floodlight controller 100. For example, in some embodiments the lower grill 218 may comprise a plurality of perforations (not shown). The lower grill 218 is preferably durable and weatherproof, and may comprises a plastic or metal material, for example. With reference to FIG. 5, the speaker 108 may be recessed within the floodlight controller 100, and a space in front of the speaker 108 may form a speaker chamber 246 configured to amplify the sounds made by the speaker 108 so that they are clearly audible in the area around the floodlight controller 100. The speaker chamber 246 may comprise a wall portion 248 extending outward from and/or around the speaker 108 toward the front wall 202 of the housing 200.

With reference to FIG. 5, the upper shield 216 and/or the lower grill 218 may abut an underlying backing plate 250, which may be integral with the housing 200 or may be a separate piece. The backing plate 250, which may be opaque, may include a first opening 252 corresponding to the location of the camera 104, a second opening 254 above the first opening and corresponding to the location of the IR light source 170, and a third opening 256 below the first opening 252 and corresponding to the location of the speaker 108.

With reference to FIG. 6, the floodlight controller 100 further comprises the microphones 106. In the illustrated embodiment, a first one 258 of the microphones 106 is located along the front of the floodlight controller 100 behind the upper shield 216 (FIG. 4) and a second one 260 of the microphones 106 is located along the left side of the floodlight controller 100 behind the left-side wall 208 (FIG. 4) of the housing 200. Including two microphones 258, 260 that are spaced from one another and located on different sides of the floodlight controller 100 provides the illustrated embodiment of the floodlight controller 100 with advantageous noise cancelling and/or echo cancelling for clearer audio. The illustrated embodiment is, however, just one example and is not limiting. Alternative embodiments may only include one microphone 106, or include two microphones 106 in different locations than as illustrated in FIG. 6.

Figure 8:
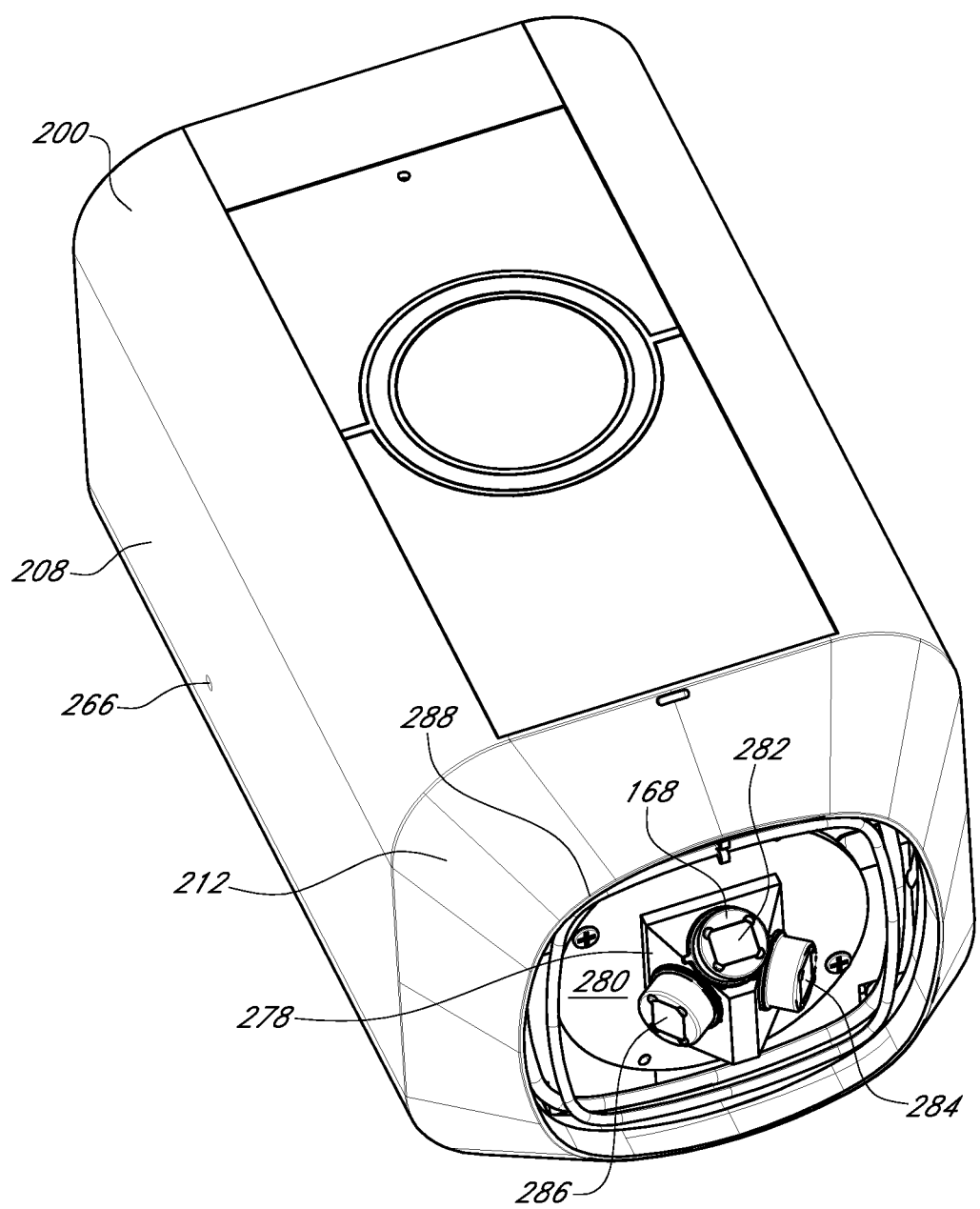
FIG. 8 is a lower front perspective view of the floodlight controller with A/V recording and communication features of FIG. 4 with a lower cover removed.

With reference to FIGS. 4 and 5, the upper shield 216 may include a first microphone opening 262 (FIG. 4) and the backing plate 250 may include a second microphone opening 264 (FIG. 5). The first and second microphone openings 262, 264, which are aligned with one another and located in front of the first microphone 258 (FIG. 6), facilitate the passage of sound through the upper shield 216 and the backing plate 250 so that sounds from the area about the floodlight controller 100 can reach the first microphone 258. With reference to FIG. 8, the left-side wall 208 of the housing 200 may include a third microphone opening 266 located in front of the second microphone 260 (FIG. 6) that facilitates the passage of sound through the left-side wall 208 of the housing 200 so that sounds from the area about the floodlight controller 100 can reach the second microphone 260.

With reference to FIGS. 5-7, the floodlight controller 100 further comprises the light pipe 230. The light pipe 230 is a transparent or translucent ring that encircles the camera 104 (FIGS. 5 and 6) and the cover 232 (FIG. 7). With reference to FIG. 5, the light pipe 230 resides in an annular space between the first opening 252 in the backing plate 250 and the camera 104, with a front surface of the light pipe 230 being substantially flush with the front surfaces of the cover 232, the upper shield 216, and the lower grill 218, as shown in FIG. 4. With reference to FIGS. 6 and 7, a rear portion of the light pipe 230 includes a plurality of feet 268 encircling the rear periphery of the light pipe 230. The feet 268 abut a light ring printed circuit board (PCB) 270, which includes the light indicators 186 (FIG. 3) arranged in a ring on a front surface of the PCB 270, with positions of the light indicators 186 corresponding to the positions of the feet 268. In some embodiments, the light indicators 186 may comprise a plurality of LEDs that are surface mounted to the front surface of the light ring PCB 270 and are arranged in a circle around the light pipe 230. The present embodiments are not limited to the light indicators 186 being LEDs, however, and in alternative embodiments the light indicators 186 may comprise any other type of light-emitting device. When the light indicators 186 are illuminated, light is transmitted through the feet 268 and the body of the light pipe 230 so that the light is visible at the front surface of the light pipe 230. The light indicators 186 and the light pipe 230 thus provide a ring of illumination around the camera 104 and the cover 232. The light pipe 230 may comprise a plastic, for example, or any other suitable material capable of transmitting light.

The light indicators 186 and the light pipe 230 may function as visual indicators for a visitor and/or a user. For example, the light indicators 186 may illuminate upon activation or stay illuminated continuously. In one aspect, the light indicators 186 may change color to indicate that motion has been detected in the area about the floodlight controller 100. In another aspect, the light indicators 186 may indicate, with different colors and/or different blinking patterns, for example, that a connection to the user's network 110 is good, limited, poor, or not connected. In another aspect, the light indicators 186 may be used to guide the user through setup or installation steps using visual cues, potentially coupled with audio cues emitted from the speaker 108. In alternative embodiments, the light pipe 230 may be omitted.

With reference to FIG. 4, the floodlight controller 100 may further comprise a light barrier 272 surrounding inner and outer surfaces of the light pipe 230. The light barrier 272 may comprise a substantially opaque material that prevents the light generated by the light indicators 186 from bleeding into the interior spaces of the floodlight controller 100 around the light pipe 230. The light barrier 272 may comprise a resilient material, such as a plastic, which may also advantageously provide moisture sealing at the junctures between the light pipe 230 and the upper shield 216 and the lower grill 218. Portions of the light barrier 272 may also extend between the junctures between the upper shield 216 and the lower grill 218.

FIGS. 6 and 7 illustrate various internal components of the floodlight controller 100, including a main printed circuit board (PCB) 274. One or more components of the floodlight controller 100 may be coupled to the main PCB 274, including one or more of the processor 162, the volatile memory 176, the non-volatile memory 178, and/or the audio CODEC 166. Each of these components is described above and illustrated in FIG. 3. With reference to FIG. 7, the AC/DC adapter 160 is coupled to the rear surface of the main PCB 274, and the antenna 188, which is operatively connected to the communication module 180, extends along a side edge of the main PCB 274. With further reference to FIG. 7, the floodlight controller 100 further comprises a communication PCB 276 to which the communication module 180 is coupled. In alternative embodiments, the communication PCB 276 may be omitted and the communication module 180 may be coupled to the main PCB 274, for example, or to another PCB.

With reference to FIG. 8, the floodlight controller 100 further comprises the motion sensor(s) 168. In the illustrated embodiment, the motion sensor(s) 168 comprise passive infrared (PIR) sensors, and three PIR sensors 168 are provided. The illustrated type and number of motion sensors is, however, merely one non-limiting example. The PIR sensors 168 are arranged about three surfaces of an inverted pyramidal PIR sensor holder 278. The PIR sensor holder 278 is coupled to a lower surface of a motion sensor printed circuit board (PCB) 280 located in the lower portion 212 of the floodlight controller housing 200. The PIR sensors 168 are arranged such that a first one 282 of the PIR sensors 168 is pointed toward the front of the floodlight controller 100 and second and third ones 284, 286 of the PIR sensors 168 are pointed toward the right and left sides, respectively, of the floodlight controller 100. The PIR sensors 168 are thus able to cover an angle of approximately 270° around the front and sides of the floodlight controller 100. The angled surfaces of the PIR sensor holder 278 further point the PIR sensors 168 at a downward angle. This configuration is well suited to a typical use case for the floodlight controller 100, since floodlights are typically located above the head level of a person of average height. A person (or other object) moving at ground level within the area about the floodlight controller 100 is thus likely to be well within the field of view of the PIR sensors 168.

The motion sensors 168 are configured to detect motion within the area about the floodlight controller 100. When motion is detected, output signals from the motion sensors 168 are received by the processor 162 (FIG. 3), and a process similar to (or the same as) that described above with reference to FIG. 2 may be initiated. In some embodiments, the camera 104 may also be used for detecting motion within the area about the floodlight controller 100. In one example embodiment, detecting motion with the camera 104 may comprise comparing video frames recorded by the camera 104. For example, the processor 162 (and/or a separate camera processor) may receive inputs of video frames from the camera 104, compare pixel differences between successive frames, and, if the pixel differences are substantial (such as being greater than one or more thresholds), determine that the pixel differences are indicative of motion within the field of view of the camera 104. The processor 162 may then initiate a process similar to (or the same as) that described above with reference to FIG. 2.

With reference to FIGS. 7 and 8, a lower end of the housing 200 includes an opening 288 (FIG. 8) that receives a Fresnel lens 290 (FIG. 7). The convexly shaped Fresnel lens 290 covers and closes the lower end opening 288 of the housing 200. The Fresnel lens 290 is configured to focus and concentrate incoming IR light on the PIR sensors 168, thereby enhancing the effectiveness and/or sensitivity of the PIR sensors 168. In alternative embodiments, the Fresnel lens 290 may be omitted.

Figure 9:
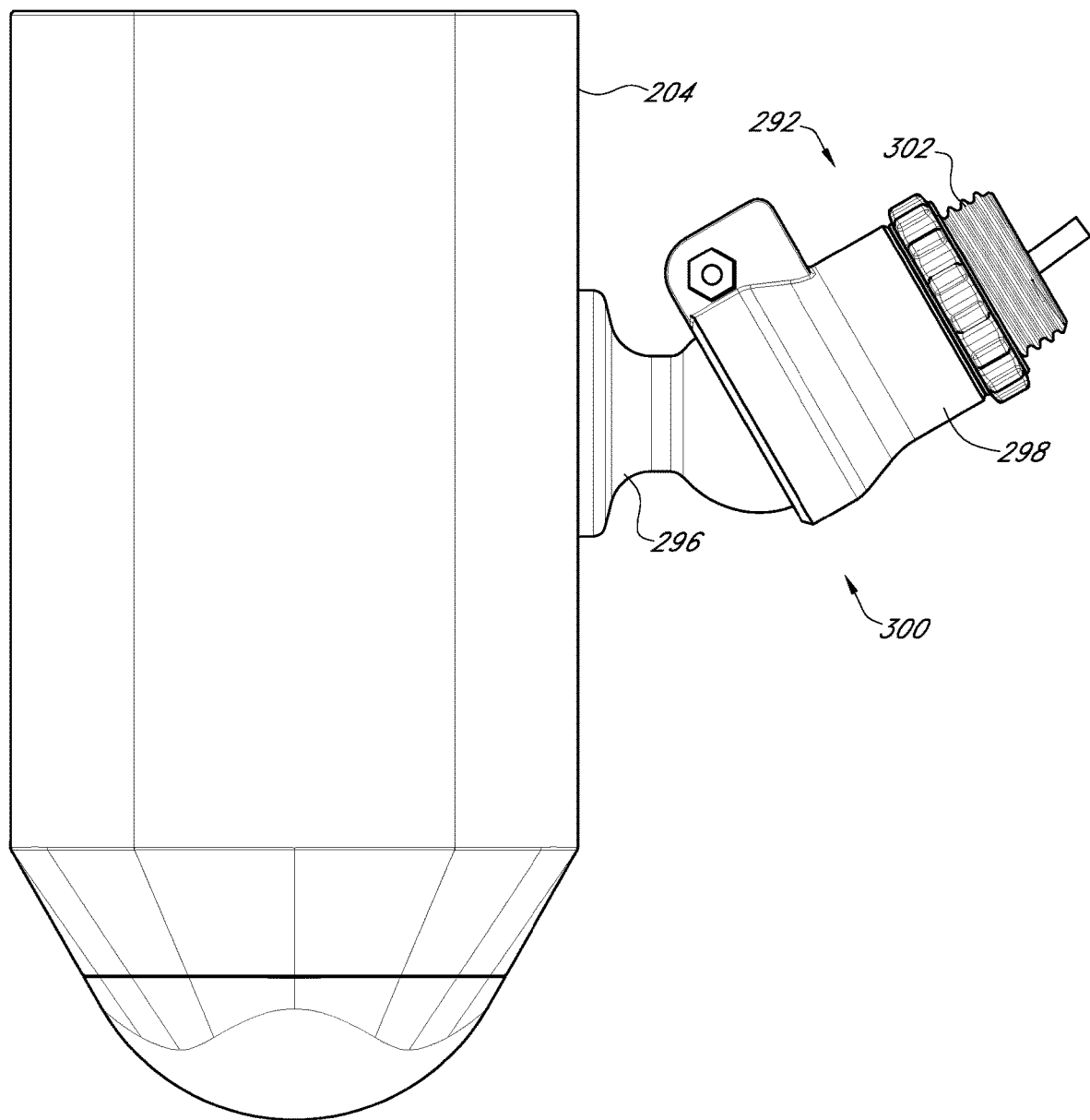
FIG. 9 is a right-side elevation view of the floodlight controller with A/V recording and communication features of FIG. 4.

With reference to FIG. 9, the floodlight controller 100 further comprises connecting hardware 292 configured for connecting the floodlight controller 100 to a floodlight device 294 (FIG. 10) and a power source (not shown). In the illustrated embodiment, the connecting hardware 292 comprises a first connecting member 296 secured to the rear wall 204 of the housing 200 and a second connecting member 298 configured to be secured to the floodlight device 294. The first and second connecting members 296, 298 meet at a ball-and-socket joint 300, such that the first and second connecting members 296, 298 are configured to articulate with respect to one another. An end of the second connecting member 298 opposite the ball-and-socket joint 300 includes threads 302 configured to matingly engage threads (not shown) on the floodlight device 294 to secure the floodlight controller 100 to the floodlight device 294. When the second connecting member 298 is secured to the floodlight device 294, the ball-and-socket joint 300 enables the orientation of the floodlight controller 100 to be adjusted so that the camera 104 can be aimed in any desired direction. The ball-and-socket joint 300 is, however, just one non-limiting example. In alternative embodiments, other types of joints may be provided between the first and second connecting members 296, 298, including non-articulating joints. In further alternative embodiments, the connecting hardware 292 may comprise a single unitary member, rather than first and second connecting members 296, 298. Similarly, the threads 302 of the second connecting member 298 are just one non-limiting example. In alternative embodiments, other types of connections may be provided between the second connecting member 298 and the floodlight device 294, such as a friction fit.

With reference to FIGS. 5 and 6, the floodlight controller 100 further comprises a plurality of wires 304 for connecting the floodlight controller 100 to the power supply and to the floodlight(s) 306 (FIG. 10) of the floodlight device 294 (for enabling the floodlight controller 100 to turn the floodlight(s) 306 on and off). In the illustrated embodiment, three wires 304 are shown, but the illustrated embodiment is merely one example and is not limiting. In alternative embodiments, any number of wires 304 may be provided.

In some embodiments, the connecting hardware 292 of the floodlight controller 100 is configured to enable easy substitution of the floodlight controller 100 for an existing motion detector of the floodlight device 294. Many floodlight assemblies include a motion detector that is easily separable from the remainder of the floodlight device. Many of these floodlight assemblies include universal-type connectors that mate the motion detector to the floodlight device. Some embodiments of the present floodlight controllers 100 may thus include connecting members that readily mate with these universal-type connectors, enabling an owner of virtually any floodlight device to easily remove the device's existing motion detector and connect the present floodlight controller 100 in its place. To further facilitate removal of an existing motion detector and replacement with the present floodlight controller 100, the wires 304 may include a plug-in connector (not shown) that mates with a corresponding plug-in connector (not shown) on the floodlight device. In alternative embodiments, embodiments of the present floodlight controllers 100 may be combined with a floodlight device during production/manufacturing to produce a floodlight assembly. The floodlight assembly including the present floodlight controller 100 may then be sold as a preassembled unit.

With reference to FIG. 3, the illustrated embodiment of the present floodlight controller 100 further comprises the switch 184 for turning the floodlight(s) 306 (FIG. 10) of an associated floodlight device 294 on and off. The switch 184 is operatively connected to the processor 162 and has an open condition and a closed condition. When the switch 184 is in the open condition the floodlight(s) 306 of the floodlight device 294 are off, and when the switch 184 is in the closed condition the floodlight(s) 306 of the floodlight device 294 are on. When the floodlight controller 100 detects motion, the processor 162 produces an output to the switch 184 to cause the switch 184 to transition from the open condition to the closed condition, thereby turning on the floodlight(s) 306 of the floodlight device 294.

Operation of the floodlight controller 100 of FIGS. 3-10 is described below with reference to the flowchart of FIG. 2. At block B130, the floodlight controller 100 detects motion (e.g. from a visitor or an intruder) and captures video images within a field of view of the camera 104. The floodlight controller 100 may detect the motion using the camera 104 and/or the motion sensor(s) 168. For example, the processor 162 may receive an input signal from at least one of the camera 104 and the motion sensor(s) 168, where the input signal indicates motion. The processor 162 may then send an output signal to the camera 104 to capture video images within a field of view of the camera 104. In embodiments of the floodlight controller 100 that don't include a motion sensor 168 separate from the camera 104, the floodlight controller 100 may detect the motion using the camera 104. As described above, the video recording/capture may begin when the motion is detected. Alternatively, also as described above, the video recording/capture may begin before the motion is detected, such as, for example, in embodiments in which the camera 104 is always on. The floodlight controller 100 may also capture audio through the microphone 106.

At block B132, the floodlight controller 100 turns on at least one floodlight 306 (FIG. 10) of an associated floodlight device 294 to illuminate the area about the floodlight controller 100. For example, the processor 162 may send an output signal to the switch 184 to cause the switch 184 to close, thereby turning on the at least one floodlight 306 of the floodlight device 294.

At block B134, the communication module 180 of the floodlight controller 100 sends a request, via the user's network 110 and the network 112, to a device in the network 112. For example, the processor 162 may send an output signal to the communication module 180 to cause the communication module 180 to send the request to the device in the network 112. For example, the network device to which the request is sent may be a server such as the server 118 or an API such as the backend API 120.

In response to the request, at block B136 the network device may connect the floodlight controller 100 to the user's client device 114 through the user's network 110 and the network 112. At block B138, the floodlight controller 100 may record available audio and/or video data using the camera 104, the microphone 106, and/or any other device/sensor available. At block B140, the audio and/or video data is transmitted (streamed) from the floodlight controller 100 to the user's client device 114 via the user's network 110 and the network 112. For example, the processor 162 may send an output signal to the communication module 180 to cause the communication module 180 to transmit (stream) the audio and/or video data from the floodlight controller 100 to the user's client device 114 via the user's network 110 and the network 112. At block B142, the user may receive a notification on his or her client device 114 with a prompt to either accept or deny the call.

At block B144, the process determines whether the user has accepted or denied the call. If the user denies the notification, then the process advances to block B146, where the audio and/or video data is recorded and stored at a cloud server (such as the storage device 116 and/or the server 118). The session then ends at block B148 and the connection between the floodlight controller 100 and the user's client device 114 is terminated. If, however, the user accepts the notification, then at block B150 the user communicates with the visitor through the user's client device 114 while audio and/or video data captured by the camera 104, the microphone 106, and/or other devices/sensors is streamed to the user's client device 114. At the end of the call, the user may terminate the connection between the user's client device 114 and the floodlight controller 100 and the session ends at block B148. In some embodiments, the audio and/or video data may be recorded and stored at a cloud server (block B146) even if the user accepts the notification and communicates with the visitor through the user's client device 114.

Figure 11:
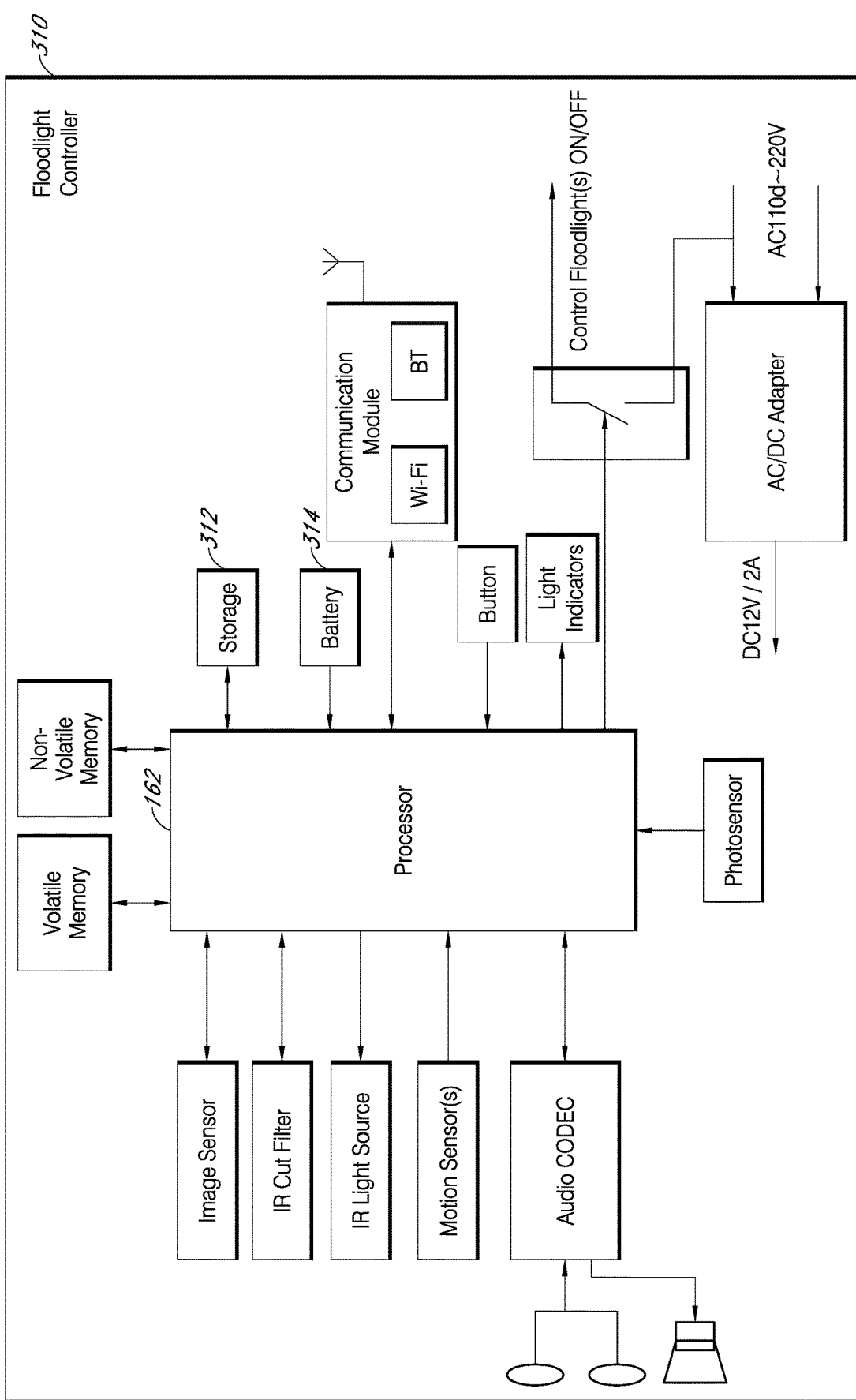
FIG. 11 is a functional block diagram of another embodiment of a floodlight controller with A/V recording and communication features, according to various aspects of the present disclosure.

FIG. 11 illustrates an alternative embodiment of the present floodlight controllers 310. The embodiment 310 of FIG. 11 includes all of the components of the embodiment 100 of FIG. 3, plus storage 312 and a battery 314. The storage 312 may comprise any type of non-volatile data storage, such as, for example, and without limitation, hard disks/drives, flash memory, or any other suitable memory/storage element. The storage 312, which is operatively connected to the processor 162, may be used to store audio and/or video information captured by the floodlight controller 310, as described in further detail below. The battery 314, which is operatively connected to the processor 162, may comprise a rechargeable battery, such as a lithium-ion battery or any other type of rechargeable battery.

As described above, the present floodlight controllers 100, 310 are connected to an external power source, such as AC mains. The embodiment 310 of FIG. 11 is similarly primarily powered by the external power source, but may also draw power from the rechargeable battery 314, such as when the external power source is not available, for example in the event of a power outage. During a power outage, the user's network 110 is likely to be unavailable, making it impossible to stream audio and/or video information from the floodlight controller 310 to the user's client device 114, or to transmit the audio and/or video information to the remote storage device 116. Advantageously, however, during a power outage the embodiment 310 of FIG. 11, by drawing power from the rechargeable battery 314, can still capture and record audio and/or video information and store the audio and/or video information locally at the storage 312. When AC mains power is restored, and the user's network 110 again becomes available, the stored audio and/or video information at the storage 312 can then be uploaded to the remote storage device 116. The embodiment of the floodlight controller 310 of FIG. 11 is thus advantageously able to function to record and store audio and video information even when AC power is unavailable. In some embodiments, the battery 314 may be configured to also provide power to at least one floodlight 306 of a floodlight device 294 to which the floodlight controller 310 is operatively connected. In such embodiments, the floodlight controller 310 of FIG. 11 is further advantageously able to turn on the floodlight(s) 306 even when AC power is unavailable.

The embodiment 310 of FIG. 11 may further comprise a power manager (not shown) configured to control from which source (AC mains or the rechargeable battery 314) the floodlight controller 310 draws power. The power manager may also control recharging of the battery 314 using power drawn from the external power source (AC mains). Alternative embodiments of the present floodlight controllers may include one or the other but not both of the storage 312 and the battery 314 shown in FIG. 11.

Figure 12:
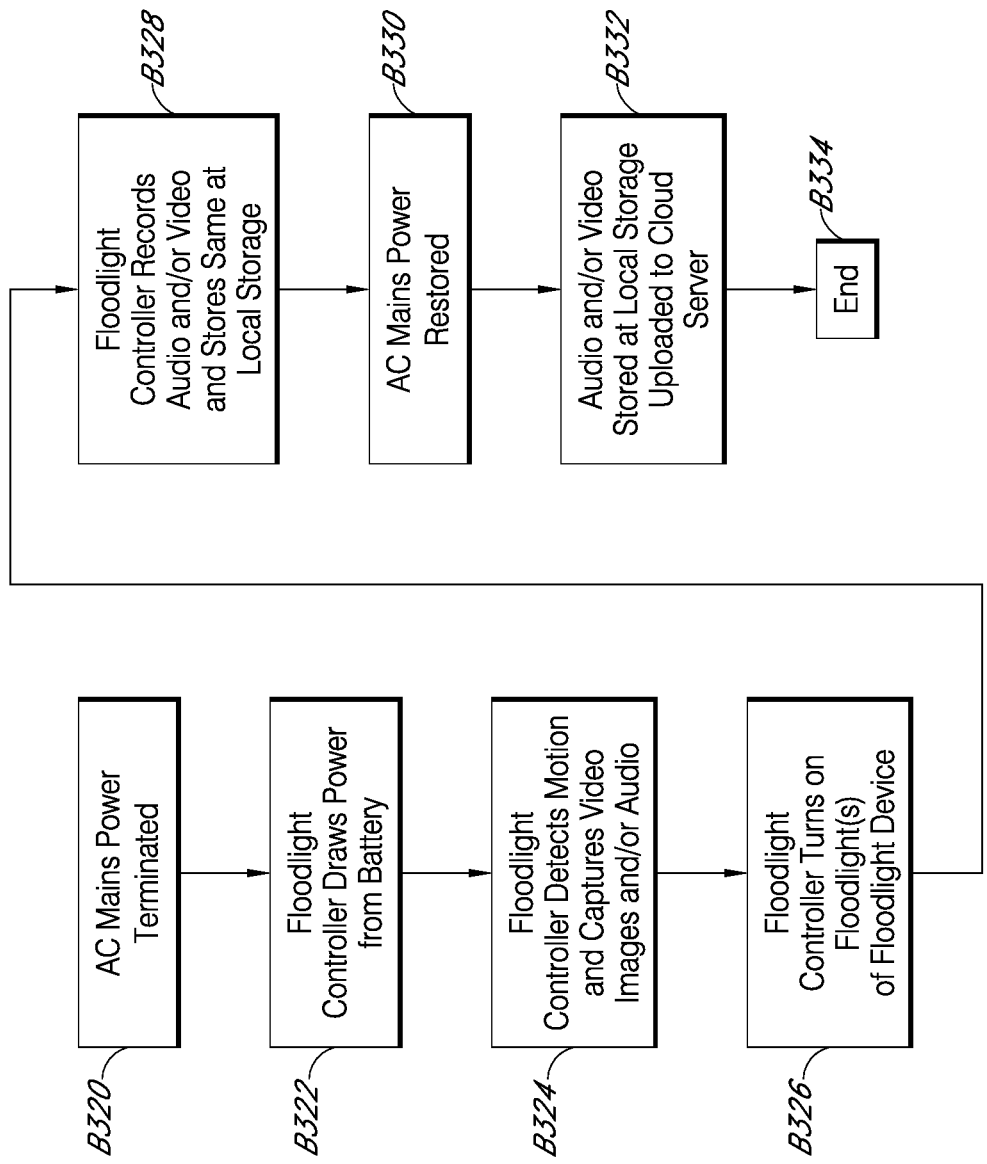
FIG. 12 is a flowchart illustrating a process for recording and storing A/V content with a floodlight controller according to various aspects of the present disclosure.

FIG. 12 is a flowchart illustrating a process for recording and storing A/V content with the floodlight controller 310 of FIG. 11, according to various aspects of the present disclosure. At the beginning of (or just prior to the beginning of) the process of FIG. 12, the floodlight controller 310 is connected to, and draws power from, an external power source (AC mains). At block B320, the AC mains power is terminated, which may happen, for example, due to a power outage, or due to a deliberate act of cutting the power to a home or business at which the floodlight controller 310 is located. At block B322, in response to the loss of AC mains power, the floodlight controller 310 draws power from the battery 314. For example, the power manager may detect the loss of AC mains power and switch the power source of the floodlight controller 310 from AC mains to the battery 314.

At block B324, the floodlight controller 310 detects motion and captures video images and/or audio. As described above, the floodlight controller 310 may detect motion via one or both of the camera 104 and the motion sensor(s) 168. At block B326, the floodlight controller 310 turns on the floodlight(s) 306 of the floodlight device 294 to illuminate the area about the floodlight controller 310. In some embodiments, the battery 314 of the floodlight controller 310 may not provide power to the floodlight device 294 when AC mains power is not available. In such embodiments, the floodlight controller 310 may activate the IR light source 170 to provide IR illumination (night vision) in the area about the floodlight controller 310.

At block B328, the floodlight controller 310 records audio and/or video of the area in the field of view of the camera 104, and stores the audio and/or video information at the local storage 312 of the floodlight controller 310. At block B330, AC mains power is restored. At some time after AC mains power is restored, the user's network 110 once again becomes available. Thus, at block B332, the audio and/or video stored at the local storage 312 of the floodlight controller 310 is uploaded to a network device, such as the storage 116 and/or the server 118, via the user's network 110 and the network 112. At block B334, the process ends.

In some embodiments, the present floodlight controllers 100, 310 may automatically emit a sound through the speaker 108 when motion is detected in the area about the floodlight controller 100, 310. For example, the sound may be a loud beep, whoop, squawk, or any other type of loud noise likely to startle any person within earshot of the speaker 108. The sound may be emitted simultaneously with (or very close in time to) the turning on of the floodlight(s) 306 of the floodlight device 294. The loud noise, coupled with the sudden illumination, may be more likely, compared with illumination alone, to startle an intruder and cause him or her to flee.

Figure 13:
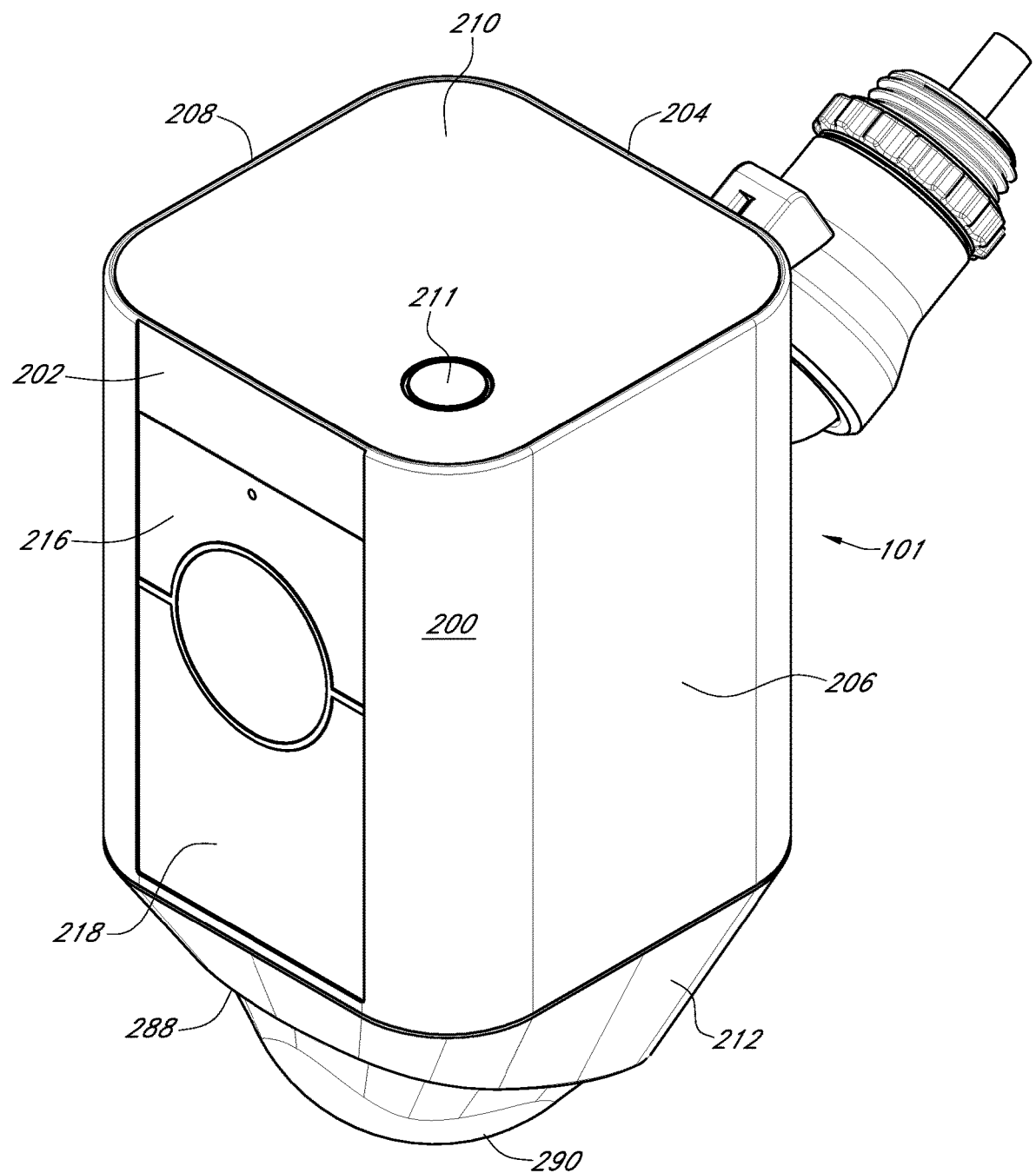
FIG. 13 is an upper front perspective view of another embodiment of a floodlight controller with A/V recording and communication features, according to the present disclosure.

FIG. 13 is an upper front perspective view of another embodiment of a floodlight controller 101 with A/V recording and communication features, according to the present disclosure. Some of the components of the floodlight controller 101 illustrated in FIG. 13 may be similar to or the same as components of the floodlight controller 100 discussed above and shown in FIGS. 4-10. For clarity, components of the floodlight controller 101 that are similar to or substantially the same as components of the floodlight controller 100 may be called out with the same reference numbers as in FIGS. 4-10. Components of the floodlight controller 101 sharing the same reference numbers as components of the floodlight controller 100 are not, however, necessarily identical, and the use of common reference numbers to describe components of alternative embodiments should not be interpreted as implying that those components are necessarily identical, although in some cases they might be.

With reference to FIG. 13, the floodlight controller 101 may comprise a housing 200 for containing and protecting the interior components of the floodlight controller 101. The housing 200 may include a front wall 202, a rear wall 204, opposing side walls 206, 208, an upper wall 210, and a tapered lower portion 212. The front wall 202 may include a central opening 214 that receives an upper shield 216 and a lower grill 218. In the illustrated embodiment, the front surfaces of the upper shield 216 and the lower grill 218 are substantially flush with a front surface of the front wall 202, but in alternative embodiments these surfaces may not be flush with one another. The upper shield 216 may also include a first microphone opening 262 to expose the first microphone 258 (FIG. 6) to capture audio from an area about the floodlight controller 200.

In some embodiments, the upper wall 210 may include an opening for a button 211. The button 211 may be operatively coupled to the processor 162 (FIG. 3), and may have similar functionality as the button 182. As illustrated in FIG. 13, the button 211 may be located on the upper wall 210 at or near the front edge thereof. In this location, the button 211 is advantageously exposed for easy access by a user, even if the floodlight controller 101 is located in an elevated position, as is typical for floodlight assemblies. Further, in some embodiments the button 211 may be large enough such that it may be pressed and held down readily using one's finger, rather than requiring any tools, thereby further enhancing the convenience provided by the button 211.

In further reference to FIG. 13, the tapered lower portion 212 may include an opening 289 that allows incoming IR light to reach the at least one motion sensor 168 (FIG. 3), such as (but not limited to) the PIR sensors 282, 284, 286 (FIG. 8), for detecting motion. In some embodiments, the opening 289 may receive a Fresnel lens 291. As discussed above with respect to the Fresnel lens 290, the convexly shaped Fresnel lens 291 may cover and close the lower end opening 289 of the housing 200. The Fresnel lens 291 is configured to focus and concentrate incoming IR light on the at least one motion sensor 168, thereby enhancing the effectiveness and/or sensitivity of the at least one motion sensor 168. In some embodiments, the tapered lower portion 212 may be configured to angle the Fresnel lens 291 to draw a greater proportion of the incoming IR light from around the front and sides of the floodlight controller, as further described below.

Figure 10:
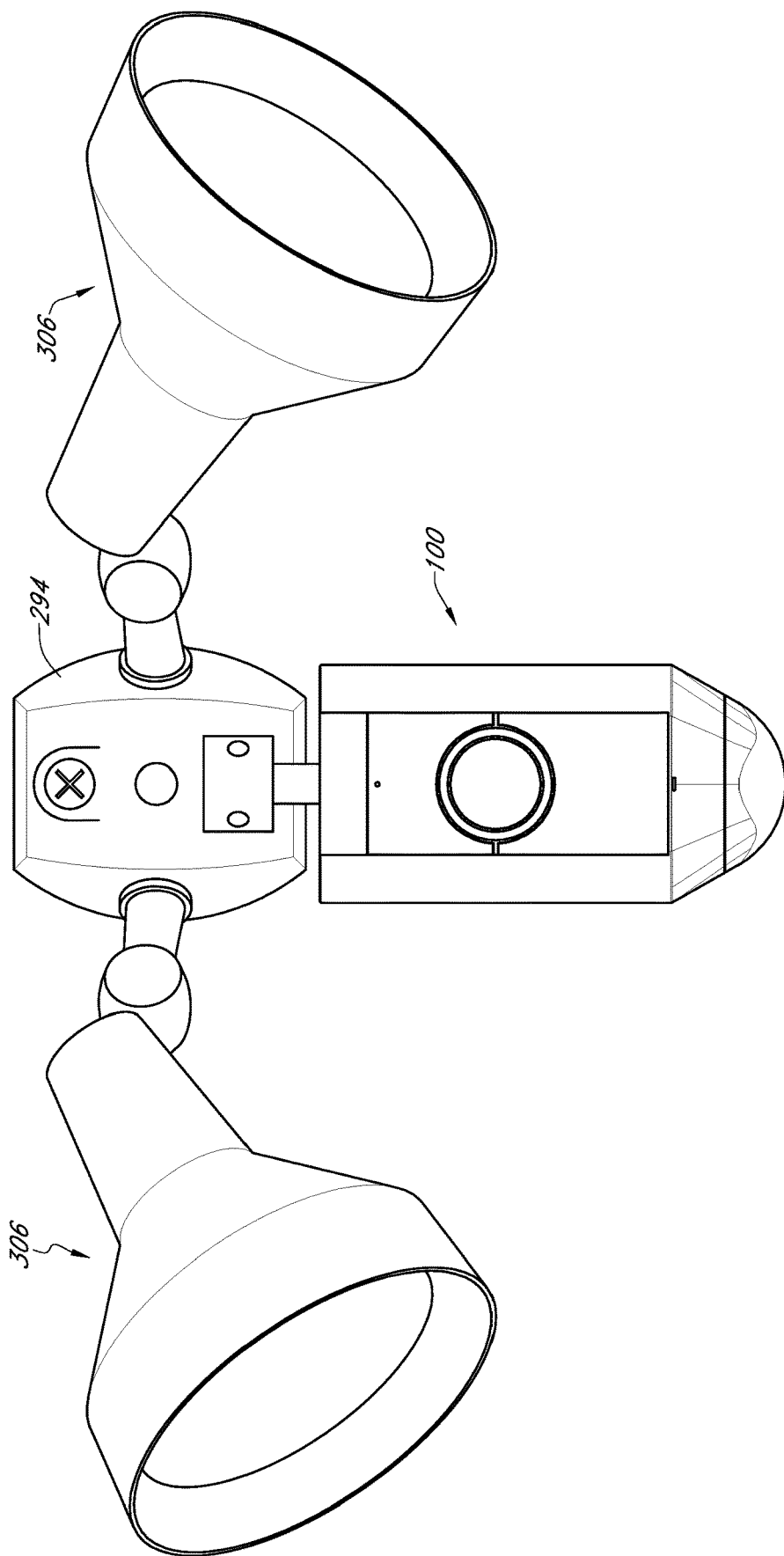
FIG. 10 is a front elevation view of the floodlight controller with A/V recording and communication features of FIG. 4 in combination with a floodlight device, according to the present disclosure.
Figure 14:
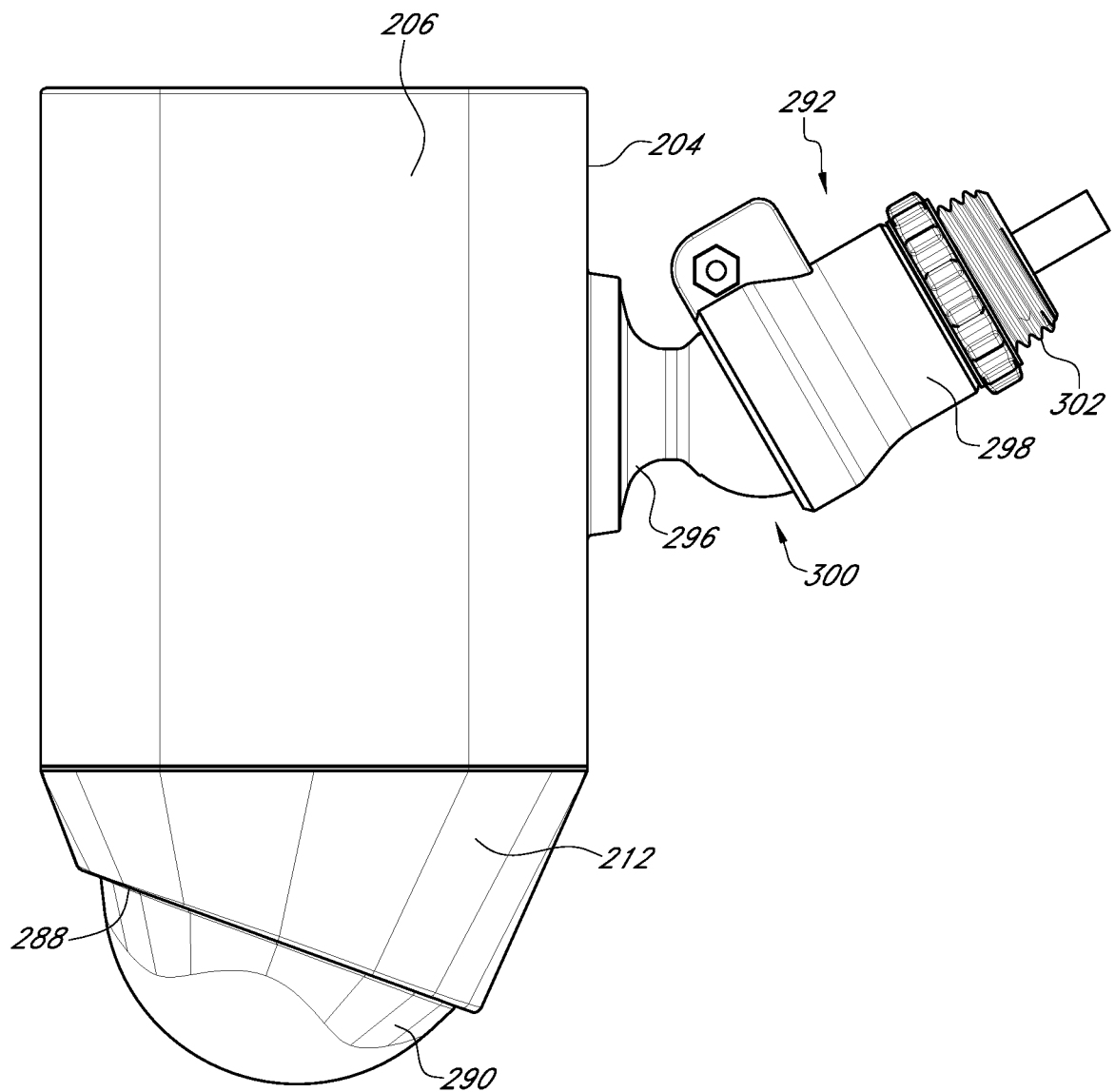
FIG. 14 is a right-side elevation view of the floodlight controller with A/V recording and communication features of FIG. 13.
Figure 15:
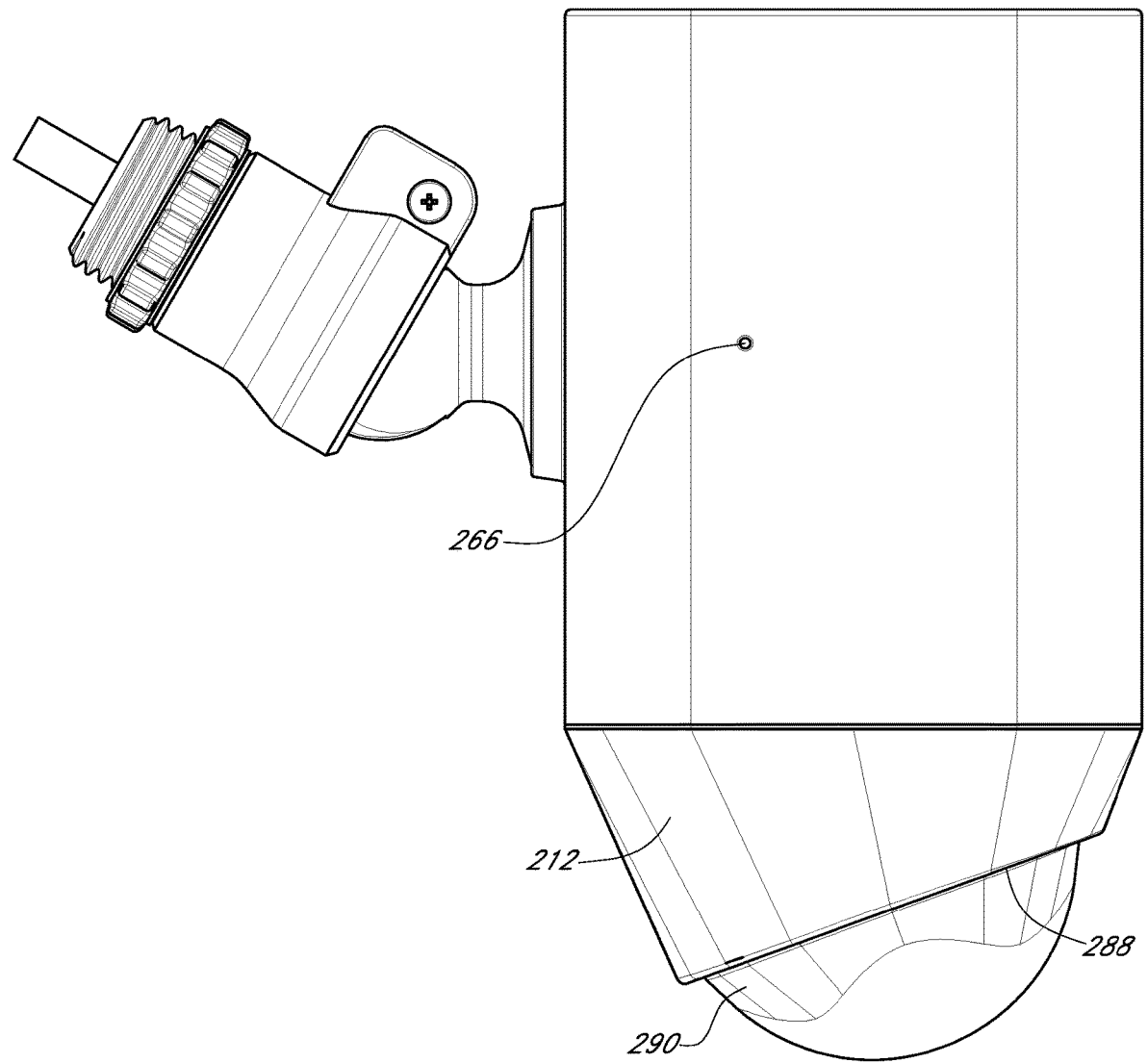
FIG. 15 is a left-side elevation view of the floodlight controller with A/V recording and communication features of FIG. 13.

FIGS. 14 and 15 are right-side and left-side elevation views, respectively, of the floodlight controller 101 of FIG. 13. In reference to FIG. 14 and as discussed above, the floodlight controller 101 may include connecting hardware 292 that may include a first connecting member 296 secured to the rear wall 204 of the housing 200 and a second connecting member 298 configured to be secured to the floodlight device 294 (FIG. 10). In some embodiments, the first and second connecting members 296, 298 may meet at a ball-and-socket joint 300, such that the first and second connecting members 296, 298 are configured to articulate with respect to one another. An end of the second connecting member 298 opposite the ball-and-socket joint 300 may include threads 302 configured to engage threads (not shown) on the floodlight device 294 to secure the floodlight controller 101 to the floodlight device 294. As discussed above, when the second connecting member 298 is secured to the floodlight device 294, the ball-and-socket joint 300 enables the orientation of the floodlight controller 101 to be adjusted so that the camera 104 can be aimed in any desired direction. In reference to FIG. 15, the housing 200 may include a third microphone opening 266, as discussed above.

In further reference to FIGS. 14 and 15, the tapered lower portion 212 may be configured to angle the Fresnel lens 291 to concentrate the incoming IR light around the front and sides of the floodlight controller 101. For example, the tapered lower portion 212 may be longer in length (extend farther downward away from the housing 200) at a rear portion 213 and shorter in length at a front portion 215, such that the opening 289 lies in a plane P (FIG. 14) that is not perpendicular to a vertical axis A of the floodlight controller 101. With reference to FIG. 14, the plane P slopes upward in the direction from the rear wall 204 toward the front wall 202 of the housing 200. In such embodiments, the opening 289 may receive the Fresnel lens 291 such that the orientation of the plane P with respect to the vertical axis A causes the Fresnel lens 291 to receive more incoming IR light at the front and sides of the floodlight controller 101 than at the rear. Configuring the opening 289 and the Fresnel lens 291 in this manner allows for a greater proportion of the light impinging upon the at least one motion sensor 168 to come from the front and sides of the floodlight controller 101, which is typically the area of greatest interest, since that is the area within the field of view of the camera 104. The configuration of the opening 289 and the Fresnel lens 291 thus further enhances the effectiveness and/or the sensitivity of the at least one motion sensor 168. Although specific features and/or components of an embodiment of a floodlight controller 101 are discussed above with respect to FIGS. 13-15, any of the features and/or components of the embodiments of the floodlight controller 100 as discussed with reference to FIGS. 4-10 may be used with the embodiment illustrated in FIGS. 13-15.

Figure 16:
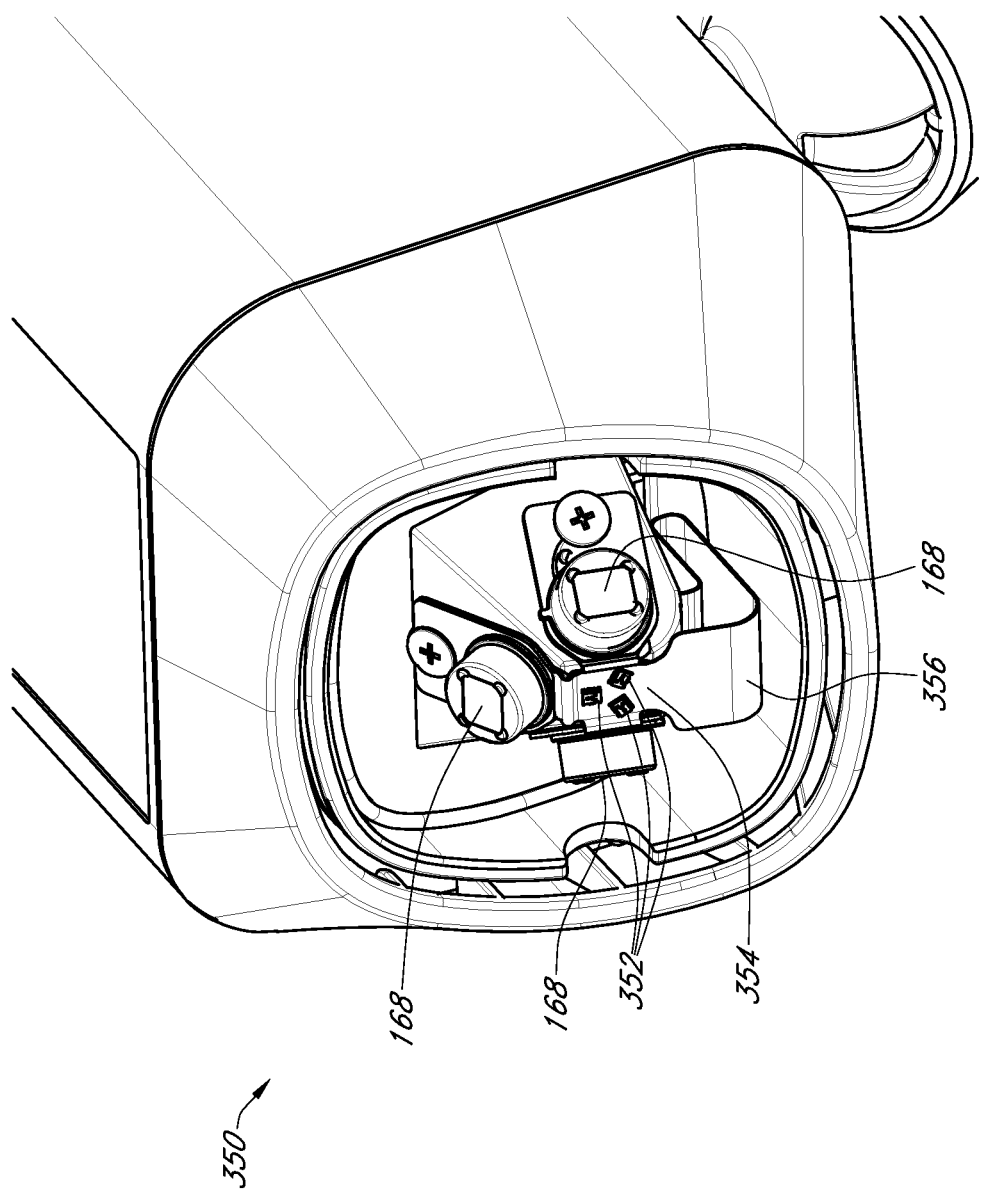
FIG. 16 is a lower front perspective view of another embodiment of a floodlight controller with A/V recording and communication features, according to the present disclosure.

In some embodiments, the present floodlight controllers may include one or more light-emitting elements (distinct from the floodlight(s) 306). For example, with reference to FIG. 16, the illustrated floodlight controller 350 includes three light-emitting elements 352 located at a lower end of the floodlight controller 350 between the PIR sensors 168. In the illustrated embodiment, the light-emitting elements 352 comprise light-emitting diodes (LEDs), but in other embodiments the light-emitting elements 352 may comprise any other type of device that emits light. Further, although the illustrated embodiment includes three light-emitting elements 352, alternative embodiments may include any number of light-emitting elements 352, such as one, or two, or four, etc. In some embodiments, the light-emitting elements 352 may comprise LEDs capable of producing a variety of colors of light, such as blue, red, green, or any other color and/or color combination.

The light-emitting elements 352 are coupled to an LED printed circuit board (PCB) 354 that is situated centrally between the PIR sensors 168. The LED PCB 354 is connected to a ribbon connector 356, which operatively couples the light-emitting elements 352 to the processor 162. The light-emitting elements 352 may be capable of the same functionality as the light indicators 186 (FIG. 3) described above. In addition, the light-emitting elements 352 may be configured to provide a visual warning to an intruder, and may further be configured to be remotely controlled by a user through an application executing on the user's client device 114. For example, as described above with reference to FIG. 2, a user may communicate with a visitor/intruder through the user's client device 114 while audio and/or video data captured by the camera 102, the microphone 104, and/or other devices/sensors is streamed to the user's client device 114. The application executing on the user's client device 114 may provide one or more options for the user to remotely control the operation (illumination) of the light-emitting elements 352. For example, the application may display on the display of the user's client device 114 one or more buttons (or another type of command/input element) enabling the user, who may be on the premises or at a remote location, to turn on the light-emitting elements 352, to change the color of the light-emitting elements 352, to cause the light-emitting elements 352 to flash, etc. Light emitted by the light-emitting elements 352 may provide a visual indicator or warning to the visitor/intruder. For example, a steady or flashing red light (or any other color) may provide a visual warning to an intruder that may cause the intruder to flee. The steady or flashing red light (or any other color) may further provide a visual cue to any neighbors or passersby of an emergency situation, which may attract the aid or assistance of others to neutralize any danger, such as by causing the intruder to flee.

As described above, the speaker 108 may be configured to emit a sound to startle and/or repel any person within earshot of the speaker 108, such as a loud beep, whoop, squawk, or any other type of loud noise, when motion is detected in the area about the floodlight controller 100, 310, 350. In some embodiments of the present floodlight controllers, the repelling sound (may also be referred to as "siren") may be remotely controlled by the user through the application executing on the user's client device 114. For example, when the user is viewing the live video stream from the camera 104, the application may display on the display of the user's client device 114 one or more buttons (or another type of command/input element) enabling the user to activate the siren. The siren may, in some embodiments, be configured to emit sound(s) at very loud volumes, such as 100 dB or more. Activation of the siren may advantageously cause any intruder(s) within earshot of the speaker 108 to flee.

As described above, the present embodiments advantageously provide floodlight controllers with video recording and two-way audio capabilities. The present floodlight controllers thus provide stronger crime deterrence than typical floodlight devices because a user can speak directly to an intruder through the floodlight controller, and because video footage captured by the floodlight controller can be used to identify criminal perpetrators. Enabling the user to speak directly to an intruder creates the illusion that the user is present at the property where the intruder is trespassing, thereby making it more likely that the intruder will flee.

Some of the present embodiments further advantageously provide the capability to record and store video even in the event of a power outage or when the AC power to a structure has been deliberately cut. Again, the video footage captured by the floodlight controller even when AC power is unavailable can be used to identify criminal perpetrators.

Figure 17:
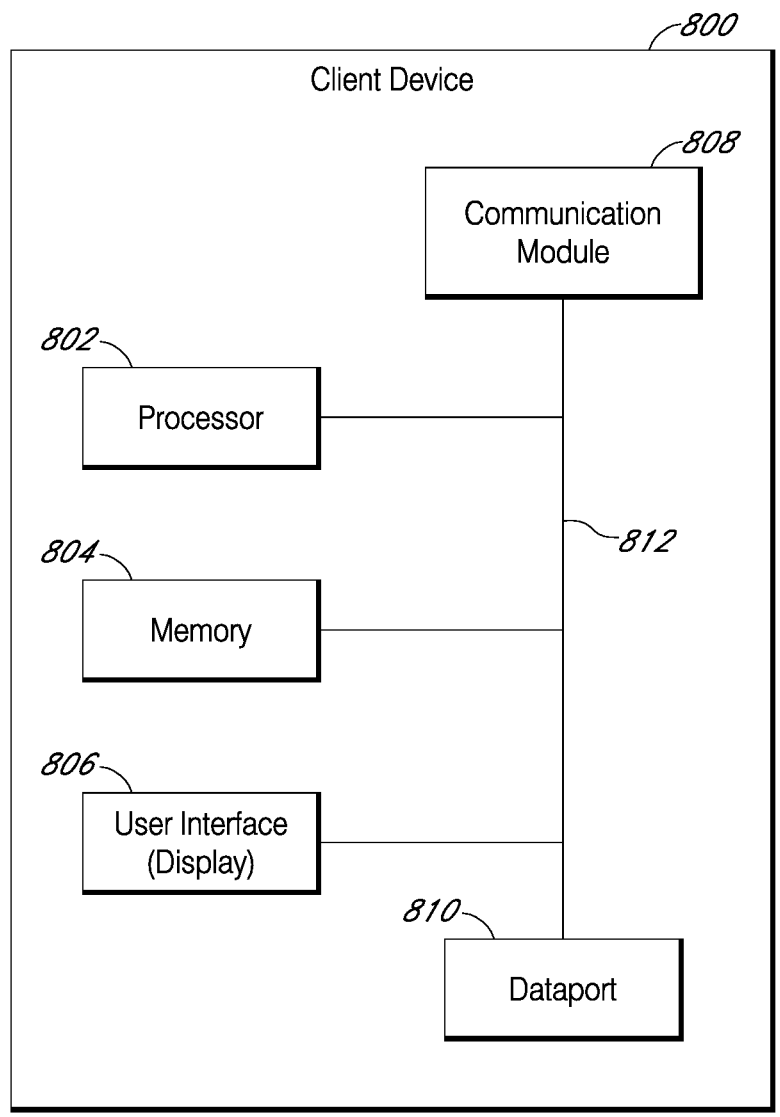
FIG. 17 is a functional block diagram of a client device on which the present embodiments may be implemented, according to various aspects of the present disclosure.

FIG. 17 is a functional block diagram of a client device 800 on which the present embodiments may be implemented, according to various aspects of the present disclosure. The user's client device 114 described with reference to FIG. 1 may include some or all of the components and/or functionality of the client device 800. The client device 800 may comprise, for example, a smartphone.

With reference to FIG. 17, the client device 800 includes a processor 802, a memory 804, a user interface 806, a communication module 808, and a dataport 810. These components are communicatively coupled together by an interconnect bus 812. The processor 802 may include any processor used in smartphones and/or portable computing devices, such as an ARM processor (a processor based on the RISC (reduced instruction set computer) architecture developed by Advanced RISC Machines (ARM).). In some embodiments, the processor 802 may include one or more other processors, such as one or more conventional microprocessors, and/or one or more supplementary co-processors, such as math co-processors.

The memory 804 may include both operating memory, such as random access memory (RAM), as well as data storage, such as read-only memory (ROM), hard drives, flash memory, or any other suitable memory/storage element. The memory 804 may include removable memory elements, such as a CompactFlash card, a MultiMediaCard (MMC), and/or a Secure Digital (SD) card. In some embodiments, the memory 804 may comprise a combination of magnetic, optical, and/or semiconductor memory, and may include, for example, RAM, ROM, flash drive, and/or a hard disk or drive. The processor 802 and the memory 804 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 802 may be connected to the memory 804 via the dataport 810.

The user interface 806 may include any user interface or presentation elements suitable for a smartphone and/or a portable computing device, such as a keypad, a display screen, a touchscreen, a microphone, and a speaker. The communication module 808 is configured to handle communication links between the client device 800 and other, external devices or receivers, and to route incoming/outgoing data appropriately. For example, inbound data from the dataport 810 may be routed through the communication module 808 before being directed to the processor 802, and outbound data from the processor 802 may be routed through the communication module 808 before being directed to the dataport 810. The communication module 808 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 810 may be any type of connector used for physically interfacing with a smartphone and/or a portable computing device, such as a mini-USB port or an IPHONE®/IPOD® 30-pin connector or LIGHTNING® connector. In other embodiments, the dataport 810 may include multiple communication channels for simultaneous communication with, for example, other processors, servers, and/or client terminals.

The memory 804 may store instructions for communicating with other systems, such as a computer. The memory 804 may store, for example, a program (e.g., computer program code) adapted to direct the processor 802 in accordance with the present embodiments. The instructions also may include program elements, such as an operating system. While execution of sequences of instructions in the program causes the processor 802 to perform the process steps described herein, hard-wired circuitry may be used in place of, or in combination with, software/firmware instructions for implementation of the processes of the present embodiments. Thus, the present embodiments are not limited to any specific combination of hardware and software.

Figure 18:
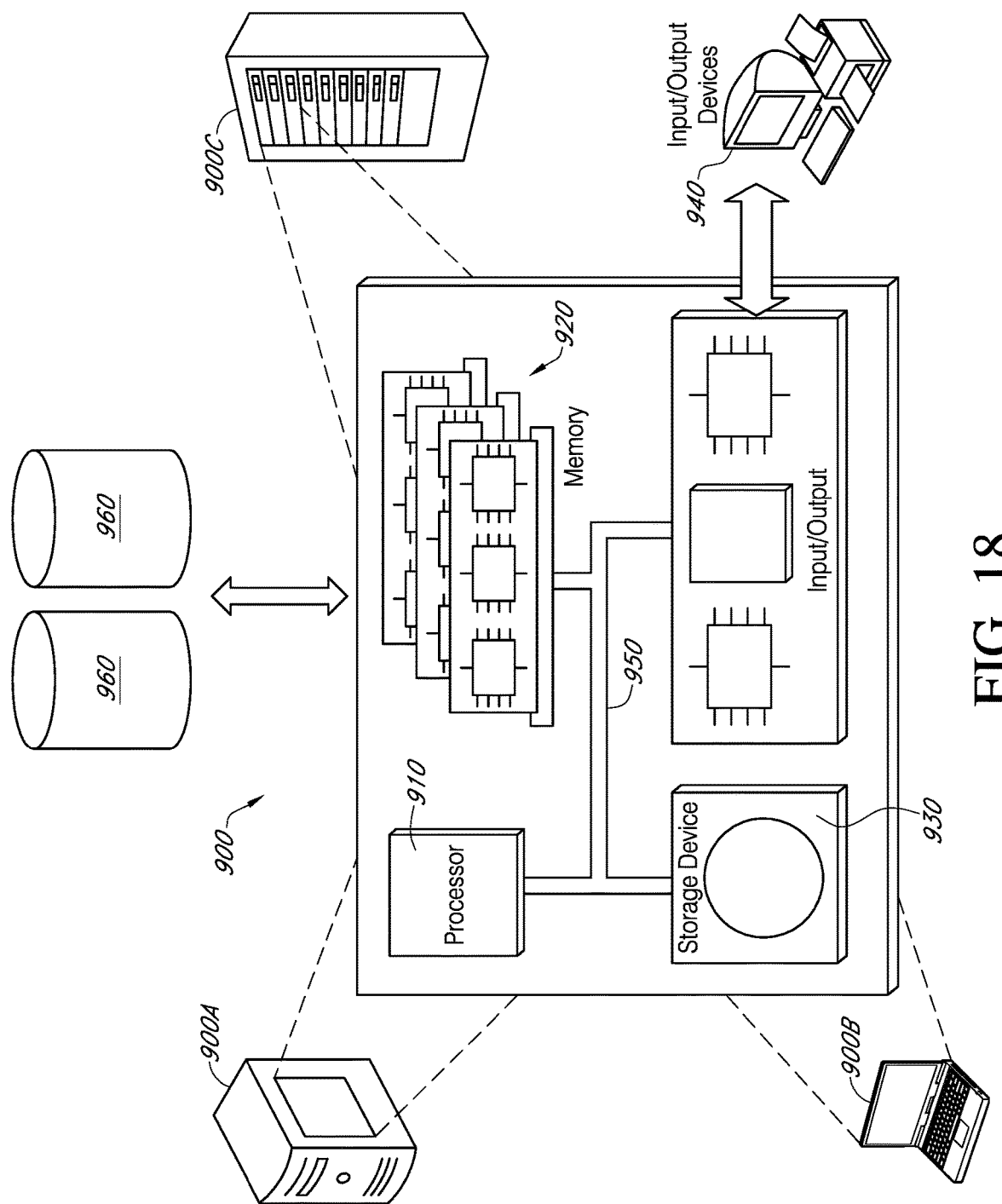
FIG. 18 is a functional block diagram of a general-purpose computing system on which the present embodiments may be implemented, according to various aspects of present disclosure.

FIG. 18 is a functional block diagram of a general-purpose computing system on which the present embodiments may be implemented, according to various aspects of the present disclosure. The computer system 900 may be embodied in at least one of a personal computer (also referred to as a desktop computer) 900A, a portable computer (also referred to as a laptop or notebook computer) 900B, and/or a server 900C. A server is a computer program and/or a machine that waits for requests from other machines or software (clients) and responds to them. A server typically processes data. The purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 900 may execute at least some of the operations described above. The computer system 900 may include at least one processor 910, memory 920, at least one storage device 930, and input/output (I/O) devices 940. Some or all of the components 910, 920, 930, 940 may be interconnected via a system bus 950. The processor 910 may be single- or multi-threaded and may have one or more cores. The processor 910 may execute instructions, such as those stored in the memory 920 and/or in the storage device 930. Information may be received and output using one or more I/O devices 940.

The memory 920 may store information, and may be a computer-readable medium, such as volatile or non-volatile memory. The storage device(s) 930 may provide storage for the system 900, and may be a computer-readable medium. In various aspects, the storage device(s) 930 may be a flash memory device, a hard disk device, an optical disk device, a tape device, or any other type of storage device.

The I/O devices 940 may provide input/output operations for the system 900. The I/O devices 940 may include a keyboard, a pointing device, and/or a microphone. The I/O devices 940 may further include a display unit for displaying graphical user interfaces, a speaker, and/or a printer. External data may be stored in one or more accessible external databases 960.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

What is claimed is:

1. A method for communicatively linking a first lighting device and a second lighting device located at a property and connected to a local network associated with the property, the first lighting device comprising a first floodlight controller having audio/video (A/V) recording and communication capabilities and a first floodlight device having a first floodlight, the second lighting device comprising a second floodlight controller having audio/video (A/V) recording and communication capabilities and a second floodlight device having a second floodlight, the method comprising:
    receiving, by a network device connected to the local network, a signal from the first floodlight controller connected to the local network indicating that the first floodlight controller has detected motion in an area about the first floodlight controller;
    sending, by the network device, in response to receiving the signal, an activation signal to the second floodlight controller located at the property and connected to the local network, the activation signal including instructions for the second floodlight controller to activate a light,
    wherein, in response to receiving the activation signal from the network device, the second floodlight controller connected to the local network turns on the second floodlight of the second floodlight device associated with the second floodlight controller; and
    establishing, by the network device, in response to receiving the signal, a network connection between a client device associated with the first floodlight controller and the second floodlight controller; and
    transmitting a live A/V stream from the first floodlight controller connected to the local network to the client device being located remotely from the first floodlight controller.

2. The method of claim 1, wherein the first floodlight controller also turns on the first floodlight of the first floodlight device associated with the first floodlight controller in response to detecting the motion.

3. The method of claim 1 further comprising receiving, from the first floodlight controller, video images of a field of view of a video camera of the first floodlight controller.

4. The method of claim 3 further comprising receiving, from the first floodlight controller, audio from the area about the first floodlight controller, wherein the audio is captured by a microphone of the first floodlight controller.

5. The method of claim 1 further comprising establishing a two-way audio communication session between a person that is a source of the detected motion by the first floodlight controller and a user located remotely from the first floodlight controller.

6. The method of claim 5, wherein the communication session enables the user to speak to the person through the client device.

7. The method of claim 5 further comprising transmitting video images of the person to the client device.

8. The method of claim 1 further comprising receiving, from the second floodlight controller, after sending the activation signal to the second floodlight controller, video images of a field of view of a video camera of the second floodlight controller.

9. The method of claim 1, wherein the first and second floodlight controllers communicate with each other through the local network.

10. The method of claim 1, wherein the first and second floodlight controllers are located at two different locations of the property.

11. The method of claim 1, further comprising determining, in response to receiving the signal, that the second floodlight controller is linked to the first floodlight controller based on a user defined relationship between the first floodlight controller and the second floodlight controller.

12. The method of claim 1, wherein the notification includes a prompt to initiate a two-way audio communication session between the first floodlight controller and the client device, and wherein the method further comprises:
    receiving a request associated with the notification to establish the two-way audio communication session between the first floodlight controller and the client device; and
    in response to receiving the request, establishing the two-way audio communication session between the first floodlight controller and the client device.

13. A first lighting device in a plurality of lighting devices, the first lighting device comprising:
    a first floodlight device having at least one floodlight; and
    a first floodlight controller comprising:
        a camera including an image sensor and having a field of view, the camera configured to capture video images;
        a set of motion sensors configured to detect motion in an area about the first lighting device;
        a speaker;
        a processor operatively connected to the camera, the set of motion sensors, and the speaker; and
        a memory storing instructions that, when executed by the processor, cause the first floodlight controller to:
            receive an input indicating that motion is detected;
            upon receiving the input, send an output to a server for activating a second lighting device in the plurality of lighting devices associated with a second floodlight controller;
            record audio and video data;
            receive instructions to establish a connection with a client device associated with the first floodlight controller and send the audio and video data to the client device;
            receive first audio data captured by the client device; and
            activate the speaker to generate sound representative of the first audio data received from the client device.

14. The first lighting device of claim 13, the memory storing further instructions that, when executed by the processor, further cause the first floodlight controller to send the output to the server as an input signal for the server to send an activation signal to the second lighting device to activate the second lighting device.

15. The first lighting device of claim 13, wherein the input indicating that the motion is detected is received from at least one motion sensor in the set of motion sensors.

16. The first lighting device of claim 13, wherein the first and second lighting devices are located at two different locations of a property.

17. The first lighting device of claim 13, wherein the first and second floodlight controllers communicate with each other through a local network.

18. The first lighting device of claim 13, wherein the memory storing instructions that, when executed by the processor, further causing the first floodlight controller to determine, in response to receiving the signal, that the second lighting device in the plurality of lighting devices is linked to the first lighting device based on a user defined relationship between the first and second lighting devices.

19. The first lighting device of claim 13, the memory storing further instructions that, when executed by the processor, further cause the first floodlight controller to send, upon receiving the input, another output to the floodlight device to turn on the at least one floodlight.

20. The first lighting device of claim 13, wherein the first floodlight controller further comprises a microphone, the memory storing further instructions that, when executed by the processor, further cause the floodlight controller to:
    record second audio data captured by the microphone of the first floodlight controller; and
    transmit the second audio data to the client device associated with the first lighting device to establish a two-way audio communication session between a first person that is a source of the motion and a second person located remotely from the first lighting device.

21. The first lighting device of claim 20, wherein the communication session enables the second person to speak to the first person through the client device associated with the first lighting device.

22. The first lighting device of claim 20, the memory storing further instructions that, when executed by the processor, further cause the first floodlight controller to transmit video images of the first person captured by the camera to the client device associated with the first lighting device.

23. A method for communicatively linking a first lighting device and a second lighting device installed at a property, each of the first lighting device comprising a first floodlight controller having audio/video (A/V) recording and communication capabilities and a first floodlight device having a floodlight, the method comprising:
    receiving a signal from the first floodlight controller indicating that the first floodlight controller detects motion in an area about the first floodlight controller;

sending, in response to receiving the signal an activation signal to the second floodlight controller located at the property, the activation signal including instructions for the second floodlight controller to activate a light, wherein, in response to receiving the activation signal, the second floodlight controller turns on the second floodlight of the second floodlight device associated with the second floodlight controller;

receiving, from the first floodlight controller, live video depicting a field of view of a video camera of the first floodlight controller;

in response to receiving the signal, transmitting the live video to a client device located remotely from the first floodlight controller; and in response to receiving the signal, transmitting a prompt to accept or deny a two-way communication session between the client device and the first floodlight controller.

* * * * *